(12) United States Patent
Sato et al.

(10) Patent No.: US 7,495,416 B2
(45) Date of Patent: Feb. 24, 2009

(54) BATTERY PACK, BATTERY PROTECTION PROCESSING APPARATUS, AND STARTUP CONTROL METHOD OF THE BATTERY PROTECTION PROCESSING APPARATUS

(75) Inventors: Hideyuki Sato, Chiba (JP); Ryuji Nakamichi, Kanagawa (JP); Yukio Tsuchiya, Kanagawa (JP); Kazuyasu Nawa, Tokyo (JP)

(73) Assignees: Sony Corporation, Tokyo (JP); Maxim Japan Co., Ltd., Tokyo (JP)

( * ) Notice: Subject to any disclaimer, the term of this patent is extended or adjusted under 35 U.S.C. 154(b) by 343 days.

(21) Appl. No.: 10/987,926

(22) Filed: Nov. 12, 2004

(65) Prior Publication Data

US 2005/0127879 A1    Jun. 16, 2005

(30) Foreign Application Priority Data

Nov. 14, 2003    (JP)    ............................. 2003-385373

(51) Int. Cl.
*H02J 7/00*    (2006.01)
(52) U.S. Cl. ........................... 320/134; 320/136; 702/63
(58) Field of Classification Search ................. 320/107, 320/112, 114, 128, 134, 136, 156, 157, 159, 320/106; 702/63, 99
See application file for complete search history.

(56) References Cited

U.S. PATENT DOCUMENTS 3,417,308 A * 12/1968 Mandel et al. .............. 320/134
4,558,281 A * 12/1985 Codd et al. .................. 324/433

(Continued)

FOREIGN PATENT DOCUMENTS

EP    1 077 520    2/2001

(Continued)

OTHER PUBLICATIONS

Patent Abstracts of Japan, JP 2002-078210 A (Rohm Co Ltd) Mar. 15, 2002.

(Continued)

*Primary Examiner*—Akm E Ullah
*Assistant Examiner*—M'Baye Diao
(74) *Attorney, Agent, or Firm*—Frommer Lawrence & Haug LLP; William S. Frommer; Thomas F. Presson

(57) ABSTRACT

A battery pack which stably implements a protection function of a secondary battery mainly under software control and reduces a circuit installation area and parts costs. The battery pack has a discharge current cutoff means and a charge current cutoff means for selectively cutting off discharge and charge currents of the secondary battery. The battery pack has a protection process means for controlling operations of the discharge current cutoff means and the charge current cutoff means in accordance with an inter-electrode voltage between positive and negative electrodes of the secondary battery. The battery pack executes an initialization process for the protection process means at a timing when a power supply voltage supplied to the protection process means reaches lowest voltage to start the protection process means. Further, the battery pack sets a threshold voltage needed for operation control of the discharge current cutoff means and the charge current cutoff means to start the protection process at another timing when the power supply voltage reaches voltage that is higher than lowest voltage and is smaller than or equal to a voltage for stable driving.

10 Claims, 19 Drawing Sheets

U.S. PATENT DOCUMENTS

| | | | | |
|---|---|---|---|---|
| 4,724,033 | A | * | 2/1988 | Vanderpool et al. ......... 156/365 |
| 5,304,915 | A | * | 4/1994 | Sanpei et al. ................ 320/116 |
| 5,576,608 | A | * | 11/1996 | Nagai et al. .................. 320/159 |
| 5,581,170 | A | | 12/1996 | Mammano et al. |
| 5,854,549 | A | * | 12/1998 | Paulick ........................ 320/110 |
| 5,909,103 | A | * | 6/1999 | Williams .................... 320/134 |
| 5,955,869 | A | | 9/1999 | Rathmann ................... 320/132 |
| 6,160,381 | A | * | 12/2000 | Peterzell ..................... 320/134 |
| 6,172,482 | B1 | * | 1/2001 | Eguchi ........................ 320/134 |
| 6,174,617 | B1 | * | 1/2001 | Hiratsuka et al. ............. 429/90 |
| 6,194,869 | B1 | * | 2/2001 | Peterzell ..................... 320/134 |
| 6,208,117 | B1 | | 3/2001 | Hibi |
| 6,320,355 | B1 | * | 11/2001 | Terada ........................ 320/136 |
| 6,340,880 | B1 | | 1/2002 | Higashijima et al. |
| 6,577,883 | B1 | * | 6/2003 | Ueda ........................... 455/573 |
| 6,646,422 | B2 | * | 11/2003 | Hogari et al. ............... 320/134 |
| 6,879,133 | B1 | * | 4/2005 | Geren ......................... 320/134 |
| 2002/0018329 | A1 | * | 2/2002 | Yoshida ..................... 361/93.1 |
| 2002/0079865 | A1 | * | 6/2002 | Thomas et al. .............. 320/136 |
| 2002/0169572 | A1 | * | 11/2002 | Suzuki et al. .................. 702/99 |
| 2003/0117110 | A1 | | 6/2003 | Herrmann et al. |
| 2004/0263123 | A1 | * | 12/2004 | Breen et al. .................. 320/128 |
| 2005/0024012 | A1 | * | 2/2005 | Astrauskas et al. .......... 320/107 |
| 2005/0127871 | A1 | * | 6/2005 | Orikasa ....................... 320/112 |
| 2005/0156574 | A1 | * | 7/2005 | Sato et al. .................... 320/134 |

FOREIGN PATENT DOCUMENTS

| | | |
|---|---|---|
| EP | 1 339 154 | 8/2003 |
| EP | 1 531 535 | 1/2007 |
| JP | 4 108341 | 9/1992 |
| JP | 2000 83325 | 3/2000 |
| JP | 2001 217012 | 8/2001 |
| JP | 2003 263246 | 9/2003 |

OTHER PUBLICATIONS

Patent Abstracts of Japan, JP 2000-295777 A (Seiko Instruments Inc) Oct. 20, 2000.

* cited by examiner

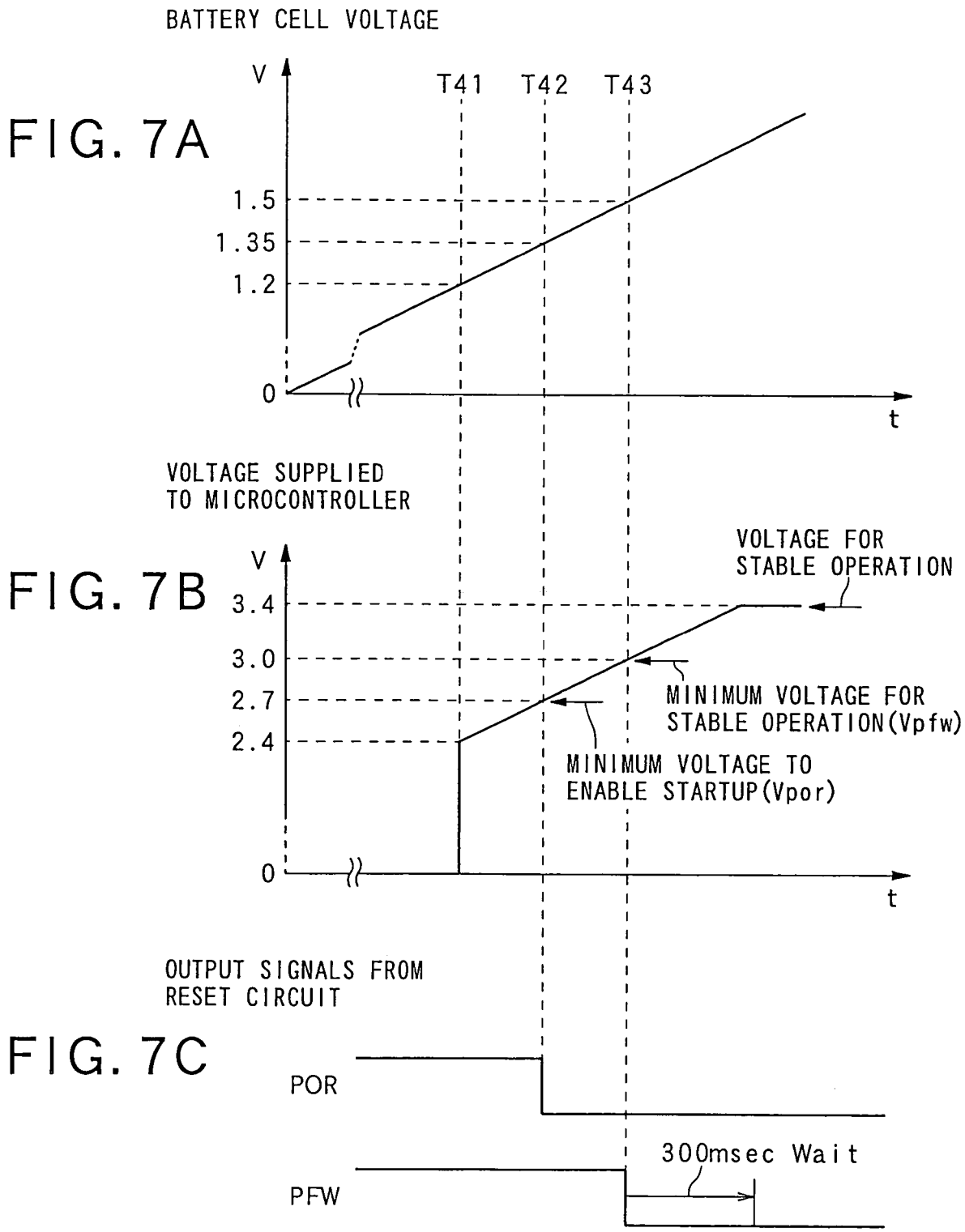

BATTERY PACK, BATTERY PROTECTION PROCESSING APPARATUS, AND STARTUP CONTROL METHOD OF THE BATTERY PROTECTION PROCESSING APPARATUS

BACKGROUND OF THE INVENTION

1. Field of the Invention

The present invention relates to a battery pack containing a secondary battery integrally with a processing circuit to perform processes including protection against anomaly occurrence in the secondary battery, a battery protection processing apparatus to perform its protection processes, and a startup control method of the battery protection processing apparatus.

This application claims priority of Japanese Patent Application No. 2003-385373, filed on Nov. 14, 2003, the entirety of which is incorporated by reference herein.

2. Description of the Related Art

In recent years, there are an increasing number of portable electronic devices such as digital video cameras on the market. A great importance is attached to the performance of secondary batteries mounted on these electronic devices. Such secondary batteries include lithium-ion batteries.

In particular, if a lithium-ion secondary battery is overcharged, lithium ion separates out as lithium metal at a negative electrode. It is known, in the worst case, that the battery smokes, ignites, or explodes. If the battery is over-discharged, the electrode inside is subject to a small amount of short-circuiting or capacity degradation. When the positive and negative electrodes are short-circuited, it is also known that an overcurrent flows to cause abnormal heating. In order to prevent overcharging, over-discharging, short-circuiting (overcurrent), the lithium-ion secondary battery is generally provided with a protection function to monitor these abnormal states and a switch to prevent the abnormal states.

FIGS. 1A and 1B present graphs showing voltage and current changes when discharge and overcurrent occur in a lithium-ion secondary battery.

FIGS. 1A and 1B show an example of lithium-ion battery cell used for digital video cameras and digital still cameras for home use. A fully charged voltage is assumed to be 4.2 V, and an over-discharge detection voltage is assumed to be 3.0 V. FIG. 1A shows changes of the battery cell voltage during discharge of 2 W power consumption. As shown in FIG. 1A, the battery cell voltage decreases down to the over-discharge detection voltage after approximately 90 minutes from the fully charged state. If a discharge load is released, the battery cell voltage temporarily increases, but gradually decreases thereafter due to self-discharge. If the battery is left unused for a long time, the battery cell voltage decreases to 0 V. When the positive and negative electrodes are short-circuited, the battery cell voltage momentarily decreases to approximately 1 V as shown in FIG. 1B. At this time, an overcurrent of approximately 15 A flows.

On the other hand, a remaining battery capacity display function is increasingly provided for the above-mentioned portable electronic devices using the secondary battery as a power supply. As shown in FIG. 1A, especially in the lithium-ion secondary battery the battery cell voltage gradually and linearly decreases except immediately before and after the discharge. Accordingly, the use of only the battery cell voltage cannot accurately detect the remaining battery capacity. It becomes possible to accurately calculate the useful remaining life by using accumulated values of a charge and discharge current, the battery cell temperature, and the like. In order to realize such remaining battery capacity display function, there is commercially available a battery pack that contains the secondary battery and circuits such as a microcontroller in the same package.

FIG. 2 shows an internal configuration example of a conventional battery pack.

The conventional battery pack in FIG. 2 comprises: a battery cell 1 comprising a lithium-ion secondary battery; protection switches SW11 and SW12 for discharging and charging control, each comprising a MOSFET (Metal Oxide Semiconductor Field Effect Transistor) equivalently containing the diode between the source and the drain according to the structure; resistor Rs for current detection; a battery protection circuit 110; a microcontroller 120; a clock oscillator 130 for microcontroller operations; a thermistor 140 to detect temperature of the battery cell 1; and a communication I/F (interface) 150 to establish communication with an electronic device provided with this battery pack.

In the battery pack, the protection switches SW11 and SW12 each comprise an FET and a diode. The protection switch SW11 can turn off discharge current. The protection switch SW12 can turn off charge current. Accordingly, when the battery cell 1 is charged, a charger is connected to a positive electrode terminal Eb1 and a negative electrode terminal Eb2. In addition, the protection switch SW12 is turned on. The positive electrode terminal Eb1 and the negative electrode terminal Eb2 may connect to a device functioning as discharge load. In this case, turning on the protection switch SW11 can supply power to the device. The battery protection circuit 110 is also integrated with various circuits for supplying power to the microcontroller.

The microcontroller 120 is a circuit to calculate information needed to display the remaining capacity of the battery cell 1 and operates on the power supplied from the battery protection circuit 110. For stable operations, the battery protection circuit 110 controls the startup timing. The microcontroller 120 computes necessary information under software control based on digitized values equivalent to charge and discharge currents and battery cell voltages supplied from the battery protection circuit 110 and on temperature values detected by the thermistor 140. The microcontroller transmits the information to the electronic device mounted with the battery pack via the communication I/F 150 and a control terminal 4. This makes it possible to display the remaining capacity of the battery in the electronic device body.

As mentioned above, however, the battery cell voltage of the secondary battery greatly varies with conditions. On the other hand, the microcontroller system is designed on the premise that the power supply voltage is stably supplied to the microcontroller. For this purpose, as shown in FIG. 2, the conventional battery pack uses another circuit independent of the microcontroller to provide the protection function that monitors anomalies such as overcharge, over-discharge, and overcurrent of the secondary battery. There is an example of such circuit that mainly comprises a special voltage comparator as a major component to implement the battery cell protection function (e.g., see Japanese Patent No. 3136677 (paragraphs [0011] through [0016], FIG. 1)).

FIG. 3 schematically diagrams battery cell states of the conventional battery pack.

As shown in FIG. 3, the conventional battery pack maintains a normal state when the voltage of the battery cell 1 ranges from 3.0 to 4.25 V, for example. In this state, both the protection switches SW11 and SW12 turn on to enable both the power supply against discharge loads and charge operations for the charger, if connected. When the voltage of the battery cell 1 exceeds 4.25 V, an overcharge state occurs. The protection switch SW12 turns off to disable the charge. When the voltage of the battery cell 1 is lower than 3.0 V and is higher than or equal to 2.50 V, an over-discharge state occurs. The protection switch SW11 turns off to disable the discharge. In this state, however, the power supply to the microcontroller 120 continues, keeping the microcontroller 120 operating.

When the voltage of the battery cell 1 becomes lower than 2.50 V, all the discharge stops to prevent the capacity degradation of the battery cell 1. Consequently, the microcontroller 120 stops operating. Thereafter, applying a voltage from the charger terminal starts charging the battery cell 1. When the voltage exceeds a specified value, the microcontroller 120 starts operating.

The current detection resistor Rs is used to detect a discharge current. When the discharge current exceeds 3.0 A, an overcurrent state occurs. The protection switch SW11 turns off to inhibit the discharge. This state also stops operations of the microcontroller 120 and the like. Releasing the discharge load automatically resumes the normal state.

As mentioned above, the conventional battery pack is independently mounted with the protection circuit for the lithium-ion secondary battery and the microcontroller to compute display of the remaining battery capacity. Recently, by contrast, it is expected to mainly use the microcontroller to implement the above-mentioned function of the protection circuit and integrate most of the circuits on a single semiconductor circuit board from the viewpoint of miniaturization, decreasing the number of parts, and reducing parts costs.

As mentioned above, however, secondary battery voltages are unstable depending on situations. The microcontroller itself is not stably supplied with the power supply voltage. It has been difficult to monitor secondary battery anomalies mainly under software control of the microcontroller. If the microcontroller realizes part of the protection function, it is mainly implemented by special hardware such as a voltage comparator. The microcontroller is used as a supplementary function for that hardware.

When the microcontroller mainly implements the protection function for the secondary battery, it is important to save as much power consumption of the microcontroller itself as possible and stably supply the power to the microcontroller.

The battery pack may use a plurality of serially connected battery cells depending on the magnitude of loads applied to a connected device. In this case, it is necessary to individually determine overcharge and over-discharge states for each of the battery cells. When only the voltage comparator is used to detect battery cell voltages as mentioned above, however, it is necessary to provide a protection circuit containing as many voltage comparators as the serially connected battery cells, causing problems of increasing design costs and enlarging the installation space.

SUMMARY OF THE INVENTION

The present invention has been made in consideration of the foregoing. It is therefore an object of the present invention to provide a battery pack which mainly uses software control to stably implement a secondary battery protection function and reduce the circuit installation space and parts costs.

It is another object of the present invention to provide a battery protection processing apparatus which mainly uses software control to stably implement a secondary battery protection function and reduce the circuit installation space and parts costs.

It is still another object of the present invention to provide a control method of enabling a battery protection processing apparatus to mainly use software control to stably implement a secondary battery protection function and reduce the circuit installation space and parts costs.

To solve the above-mentioned problems, the present invention provides a battery pack composed of a secondary battery integrally with a processing circuit to perform processes including protection against error occurrence in the secondary battery, the battery pack comprising: a discharge current cutoff means for selectively cutting off a discharge current in the secondary battery; a charge current cutoff means for selectively cutting off a charge current in the secondary battery; a protection process means for controlling operations of the discharge current cutoff means and the charge current cutoff means at least in accordance with an inter-electrode voltage between positive and negative electrodes of the secondary battery; and a startup-enabling voltage detection means for generating a detection signal when a power supply voltage supplied to the protection process means reaches a lowest voltage to start the protection process means, wherein the protection process means performs an initialization process in accordance with detection of a detection signal from the startup-enabling voltage detection means.

In such battery pack, the protection process means controls operations of the discharge current cutoff means and the charge current cutoff means at least in accordance with an inter-electrode voltage between positive and negative electrodes of the secondary battery. For example, when it is determined that the secondary battery is placed in the overcharge state, the charge current cutoff means cuts off the charge current. When it is determined that the secondary battery is placed in the over-discharge state, the discharge current cutoff means cuts off the discharge current. In this manner, the secondary battery is protected against abnormal states such as an overcharge and an over-discharge. Based on a signal detected by the startup-enabling voltage detection means, an initialization process for the protection process means is performed at a timing when a power supply voltage supplied to the protection process means reaches the lowest voltage to start the protection process means. Accordingly, the protection process means stops operating in accordance with a decrease in the power supply voltage supplied from the secondary battery. Thereafter, the protection process means starts when the power supply voltage rises so sufficiently as to enable the startup. The protection process means is initialized simultaneously with the startup to stabilize the operation state.

Further, there may be provided a stable drive voltage detection means for generating a detection signal when the power supply voltage of the protection process means reaches a specified voltage which is higher than the lowest voltage and is smaller than or equal to a voltage to stably drive the protection process means. The protection process means, after performing the initialization process, may configure a threshold voltage needed for operation control of the discharge current cutoff means and the charge current cutoff means in accordance with detection of a detection signal from the stable drive voltage detection means. In this manner, the power supply voltage rises much higher than the above-mentioned lowest voltage then data setting needed for the secondary battery protection process is more reliably performed to start the protection process.

Moreover, the present invention provides a startup control method for a battery protection process apparatus which performs a process to protect a secondary battery against anomaly occurrence by controlling operations of a discharge current cutoff circuit to selectively cut off discharge current of the secondary battery and a charge current cutoff circuit to selectively cut off charge current of the secondary battery according to voltages between positive and negative electrodes of the secondary battery, the method comprising: performing an initialization process of the battery protection process apparatus when a power supply voltage supplied to the battery protection process apparatus reaches the lowest voltage to start the battery protection process apparatus.

The startup control method for the battery protection process apparatus performs an apparatus' initialization process at a timing when a power supply voltage supplied to the battery protection process apparatus reaches the lowest voltage to start the apparatus. Accordingly, the battery protection process apparatus stops operating in accordance with a decrease in the power supply voltage supplied from the secondary battery. Thereafter, the protection process means starts when the power supply voltage rises so sufficiently as to enable the startup. The battery protection process apparatus is initialized simultaneously with the startup to stabilize the operation state.

Furthermore, it may be preferable to configure a threshold voltage needed for operation control of the discharge current cutoff circuit and the charge current cutoff circuit and start the secondary battery's protection process when the power supply voltage reaches a specified voltage which is higher than the lowest voltage and is smaller than or equal to a voltage to stably drive the battery protection process apparatus. In this manner, the power supply voltage rises much higher than the above-mentioned lowest voltage then data setting needed for the secondary battery protection process is more reliably performed to start the protection process.

According to the battery pack of the present invention, the protection process means for performing the secondary battery's protection process starts when the power supply voltage rises so sufficiently as to enable the startup. The protection process means is initialized simultaneously with the startup to stabilize the operation state. Accordingly, software control can be provided to stably perform the protection process for the secondary battery subject to large voltage variations. It becomes possible to more reliably protect the secondary battery, reduce the circuit installation area and manufacturing costs, and easily implement the highly accurate protection process.

Further, the stable drive voltage detection means is provided for generating a detection signal when the power supply voltage for the protection process means reaches a specified voltage which is higher than the lowest voltage to start the protection process means and is smaller than or equal to a voltage to stably drive the protection process means. The protection process means, after performing the initialization process, can configure a threshold voltage needed for operation control of the discharge current cutoff means and the charge current cutoff means in accordance with detection of a detection signal from the stable drive voltage detection means. In this case, after the power supply voltage rises much higher than the above-mentioned lowest voltage the secondary battery protection process is started. It becomes possible to more reliably perform the protection process.

According to the startup control method for the battery protection process apparatus of the present invention, the battery protection process apparatus starts when the power supply voltage rises so sufficiently as to enable the startup. The battery protection process apparatus is initialized simultaneously with the startup to stabilize the operation state. Accordingly, software control can be provided to stably perform the protection process for the secondary battery subject to large voltage variations. It becomes possible to more reliably protect the secondary battery, reduce the circuit installation area and manufacturing costs for the battery protection process apparatus, and easily implement the highly accurate protection process.

Furthermore, it is possible to configure a threshold voltage needed for operation control of the discharge current cutoff circuit and the charge current cutoff circuit and start the secondary battery's protection process when the power supply voltage supplied to the battery protection process apparatus reaches a specified voltage which is higher than the lowest voltage to start the apparatus and is smaller than or equal to a voltage to stably drive the apparatus. In this case, after the power supply voltage rises much higher than the above-mentioned lowest voltage, the secondary battery protection process is started. It becomes possible to more reliably perform protection process.

BRIEF DESCRIPTION OF THE DRAWINGS

FIGS. 7A through 7C show relationship among output signals from reset circuits, and power supply voltages of the battery cell and the microcontroller;

DETAILED DESCRIPTION OF THE PREFERRED EMBODIMENTS

An embodiment of the present invention will be described in further detail with reference to the accompanying drawings.

Figure 1A:
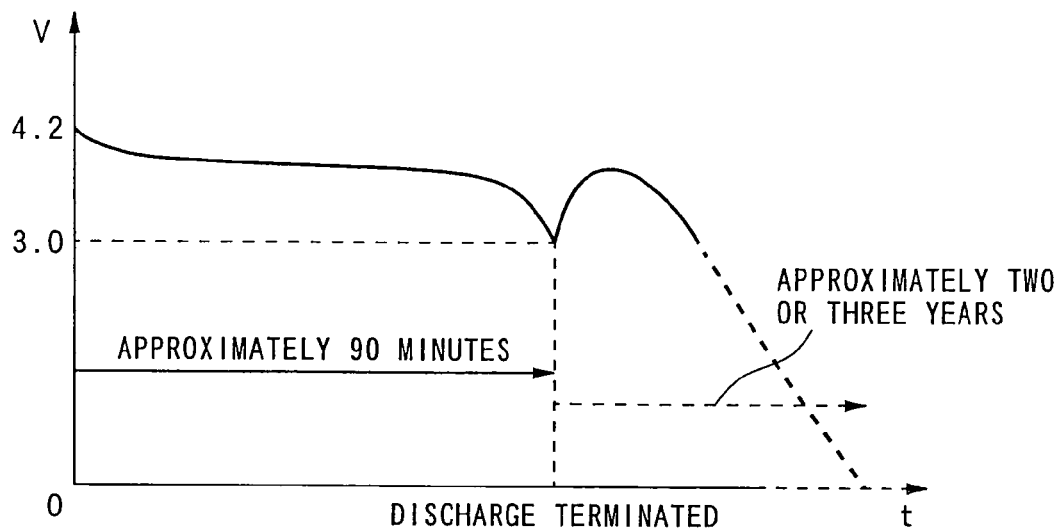
FIGS. 1A and 1B present graphs showing voltage and current changes when discharge and overcurrent occur in a lithium-ion secondary battery.
Figure 1B:
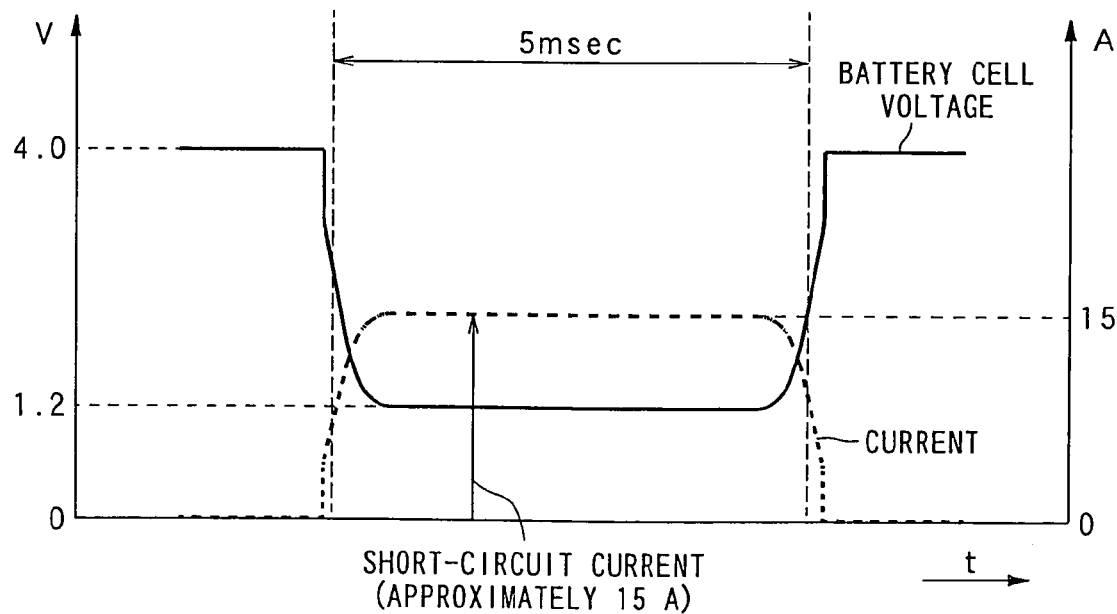
Figure 2:
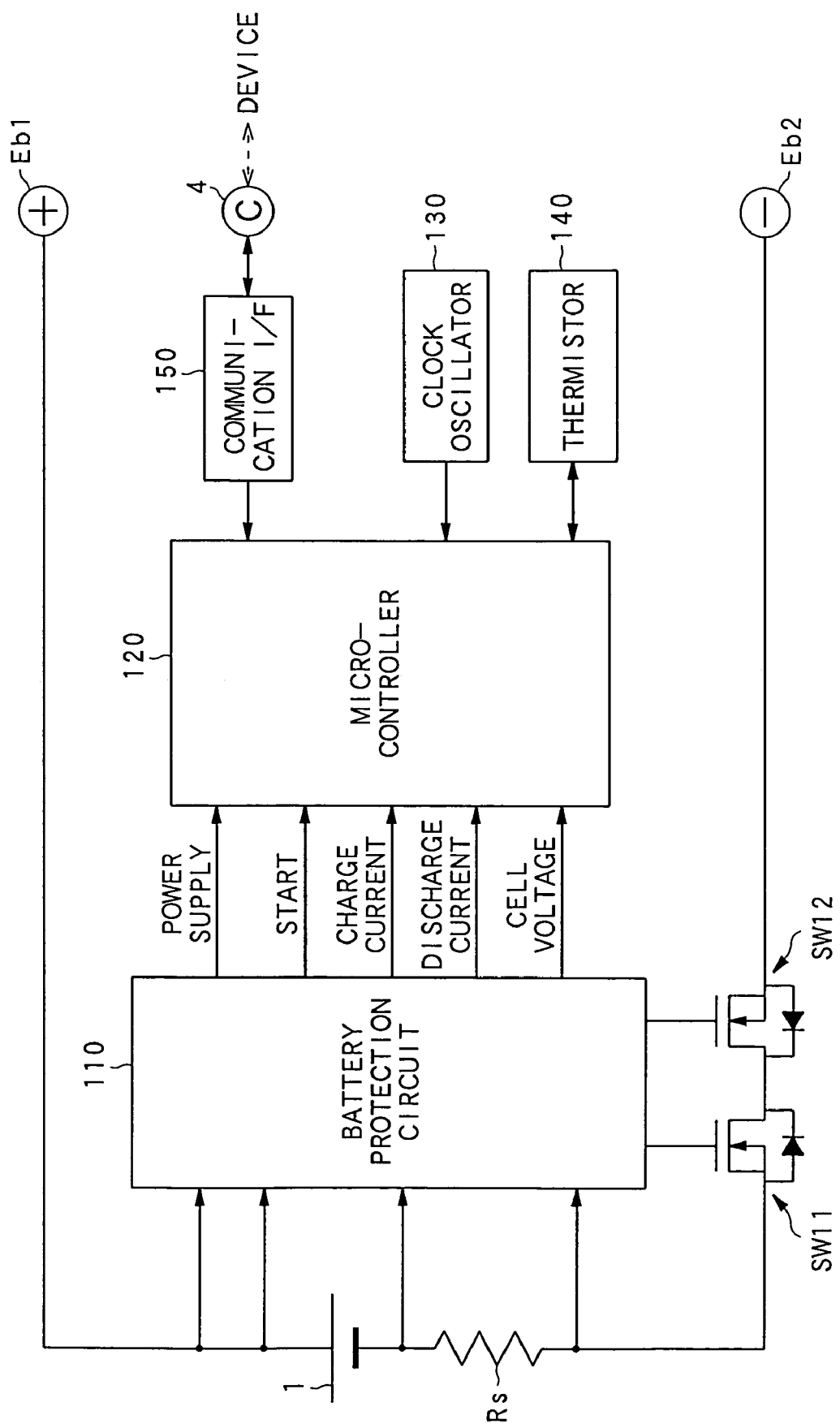
FIG. 2 shows an internal configuration example of a conventional battery pack.
Figure 3:
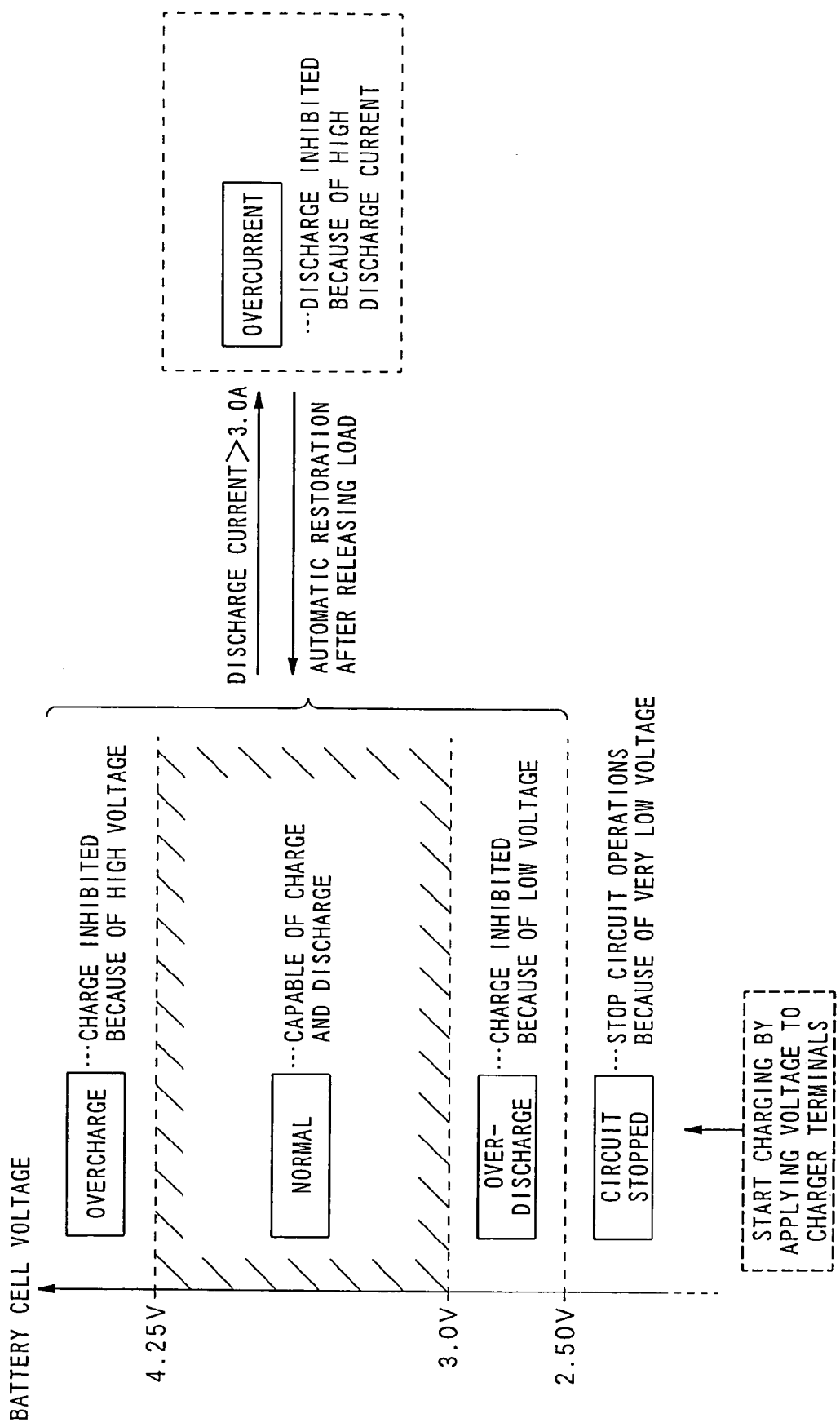
FIG. 3 schematically diagrams battery cell states of the conventional battery pack.
Figure 4:
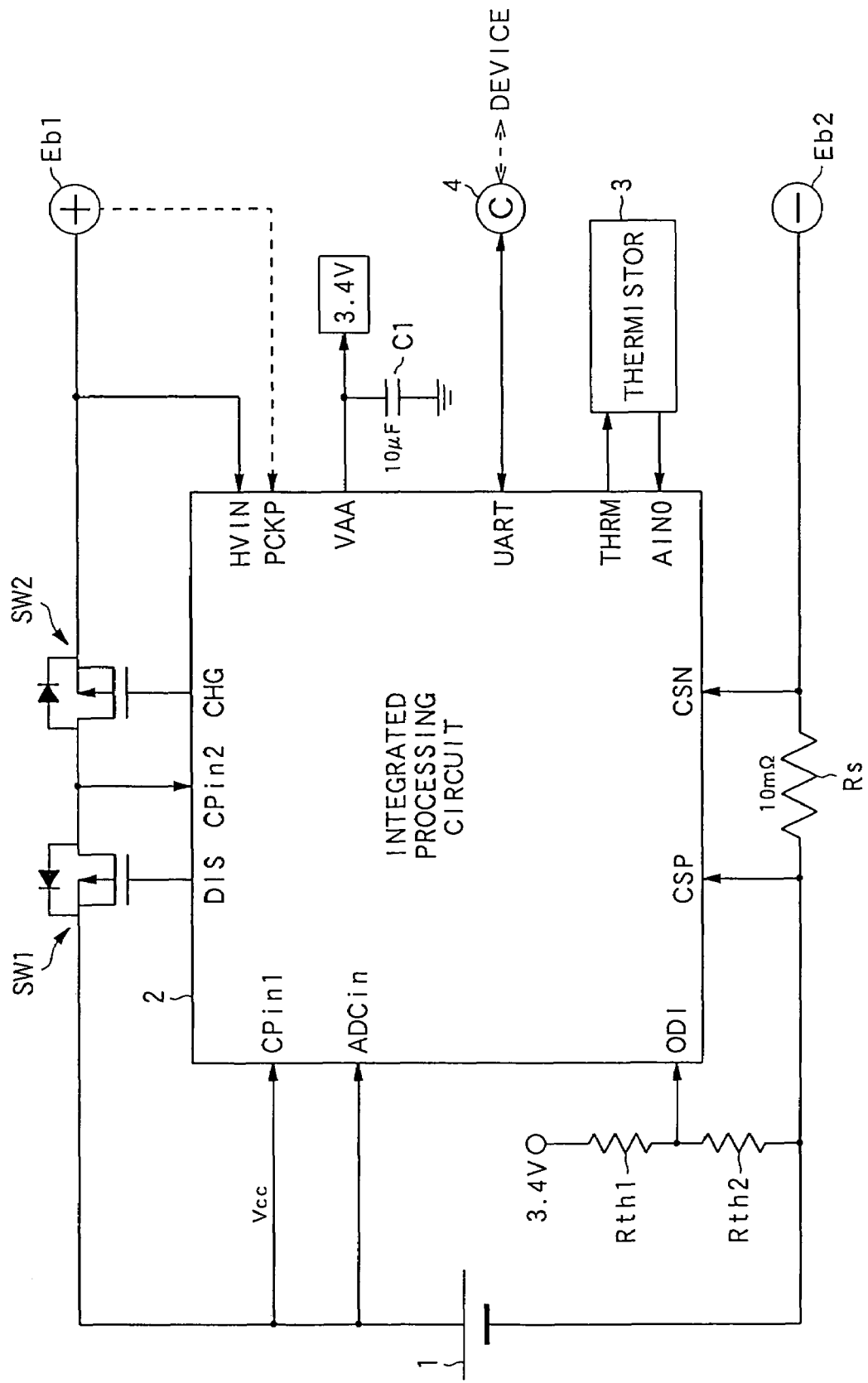
FIG. 4 shows an internal configuration example of a battery pack according to an embodiment of the present invention.

FIG. 4 shows an internal configuration example of a battery pack according to an embodiment of the present invention.

The battery pack according to the present invention is an integrated package of a secondary battery and a circuit that implements a process function to display the remaining capacity of the secondary battery and the protection function against abnormal states of the secondary battery. The embodiment uses a lithium-ion secondary battery having such discharge characteristics that a discharge voltage decreases relatively gently and linearly. The use of such secondary battery makes it possible to accurately detect the remaining battery capacity and display it in terms of available remaining time, for example.

The battery pack in FIG. 4 has: a battery cell 1 comprising the lithium-ion secondary battery; an integrated processing circuit 2 formed on the same semiconductor substrate to control operations of the above-mentioned process function for displaying the remaining battery capacity and the protection function; protection switches SW1 and SW2 for discharge control and charge control; a current detection resistor Rs; a capacitor C1 to stabilize output voltages; resistors Rth1 and Rth2 to set threshold values; and a thermistor 3 to detect the temperature of the battery cell 1.

In the battery pack, the protection switches SW1 and SW2 each comprise a MOSFET equivalently containing the diode between the source and the drain according to the structure. The protection switches SW1 and SW2 can turn off a discharge current and a charge current, respectively. When the battery cell 1 is charged, a charger is connected to the positive electrode terminal Eb1 and the negative electrode terminal Eb2, and the protection switch SW2 turns on. When a device as discharge load is connected to the positive electrode terminal Eb1 and the negative electrode terminal Eb2, the protection switch SW1, if turned on, allows the device to be powered.

The integrated processing circuit 2 is powered from two points, i.e., power supply terminals CPin1 and CPin2 that can be selectively used in the integrated processing circuit 2. The power supply terminal CPin1 is connected to a positive electrode side of the battery cell 1 and supplies a voltage of the battery cell 1 (hereafter referred to as a cell voltage) to the integrated processing circuit 2. The power supply terminal CPin2 is connected between the protection switches SW1 and SW2. As will be described later, when a cell voltage is extremely low, the power supply terminal CPin2 can supply voltage from the charger to operate the integrated processing circuit 2. Operations of the protection switches SW1 and SW2 can be selected according to output voltages from output terminals DIS and CHG, respectively.

The integrated processing circuit 2 further comprises various input/output terminals. An input terminal ADCin is connected to the positive electrode side of the battery cell 1. Input terminals CSP and CSN are connected to both ends of the resistor Rs. An input terminal HVIN is connected between the positive electrode terminal Eb1 and the protection switch SW2. An input/output terminal UART is used for communication with a device mounted with the battery pack and is connected to a device's communication terminal via the control terminal 4. An output terminal VAA outputs a 3.4 V reference voltage (operating voltage of the integrated processing circuit 2). The reference voltage from the output terminal VAA is divided by the resistors Rth1 and Rth2 and is applied to an input terminal ODI. An output terminal THRM outputs a control signal for the thermistor 3. An output signal from the thermistor 3 is supplied to an input terminal AIN0.

Figure 5:
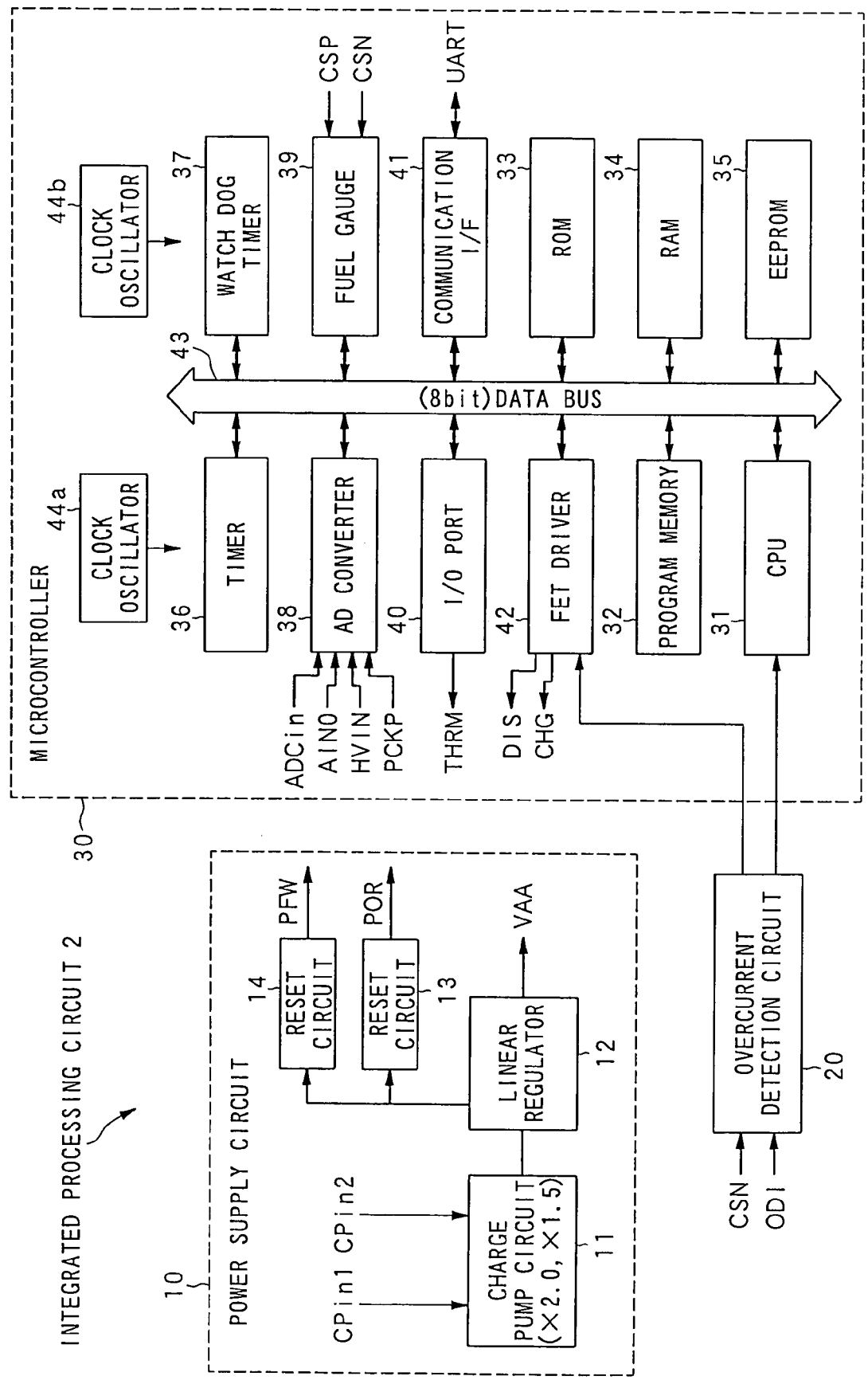
FIG. 5 is a block diagram showing an internal configuration example of an integrated processing circuit.

FIG. 5 is a block diagram showing an internal configuration example of the integrated processing circuit 2.

As shown in FIG. 5, the integrated processing circuit 2 broadly comprises a power supply circuit 10, an overcurrent detection circuit 20, and a microcontroller 30. The power supply circuit 10 further comprises: a charge pump circuit 11 and a linear regulator 12 to supply the microcontroller 30 with drive voltages; and reset circuits 13 and 14 to reset the microcontroller 30.

The charge pump circuit 11 selects a voltage supplied from one of the power supply terminals CPin1 and CPin2 and boosts the voltage 1.5 times or twice. The linear regulator 12 stabilizes the input voltage boosted by the charge pump circuit 11 to 3.4 V. An output voltage from the linear regulator 12 is supplied as a drive voltage to the microcontroller 30. The output voltage is output from the output terminal VAA and is also supplied to the reset circuits 13 and 14.

The reset circuits 13 and 14 each have a comparator to compare an output voltage from the linear regulator 12 with the reference voltage. According to comparison results of the comparator, the reset circuits 13 and 14 vary output levels of a power-on reset signal (hereafter referred to as signal POR) and a power fail warning signal (hereafter referred to as signal PFW) to control startup operations of the microcontroller 30. The reset circuit 13 sets the signal POR to the L level when the linear regulator 12 outputs a voltage greater than or equal to the minimum voltage (2.7 V in the embodiment) needed to start the microcontroller 30. The reset circuit 14 sets the signal PFW to the L level when the linear regulator 12 outputs a voltage greater than or equal to the minimum voltage (3.0 V in the embodiment) needed to stably operate the microcontroller 30. Output signals from the reset circuits 13 and 14 are input to a reset terminal (not shown) that detects reset timing of the microcontroller 30.

The overcurrent detection circuit 20 detects a current value from a voltage between input terminals CSN and ODI. When detecting an overcurrent, the overcurrent detection circuit 20 notifies this to the microcontroller 30 (CPU 31) by means of an interrupt. Further, the overcurrent detection circuit 20 controls the protection switches SW1 and SW2 and performs an operation to protect the battery cell 1. The internal configuration of the overcurrent detection circuit 20 will be described later with reference to FIG. 12.

The microcontroller 30 is configured to connect the following with each other via a data bus 43: a CPU (Central Processing Unit) 31; a program memory 32; ROM (Read Only Memory) 33; RAM (Random Access Memory) 34; EEPROM (Electrically Erasable Programmable ROM) 35; a timer 36; a Watch Dog Timer 37; an AD converter 38; a fuel gauge 39; an I/O port 40; a communication I/F (interface) 41; and an FET driver 42. The microcontroller 30 contains clock oscillators 44a and 44b that generate instruction clocks with different frequencies (32 kHz and 6 MHz) to operate the respective blocks.

The CPU 31 reads and executes programs stored in program memory 32 and EEPROM 35 to control the overall operation of the microcontroller 30. The program memory 32 is a nonvolatile storage medium and previously stores a program to operate each part of the microcontroller 30. ROM 33 previously stores data and the like needed for the CPU 31 to execute the program. RAM 34 comprises SRAM (Static RAM), for example, and temporarily stores part of the program executed by the CPU 31 and data needed for program processes. In addition, the microcontroller 30 has EEPROM 35 as nonvolatile memory. The EEPROM 35 is capable of not only storing software executed by the CPU 31 and configuration data, but also rewriting them as needed.

The timer 36 measures the time needed for each part of the microcontroller 30. The watch dog timer 37 monitors commands executed by the CPU 31 based on the time measured by the timer 36. When it is determined that the system terminates abnormally, the watch dog timer 37 automatically resets the microcontroller 30.

The AD converter 38 converts signals from the input terminals ADCin, AIN0, HVIN, and PCKP into digital signals and supplies them to the CPU 31. In this manner, the microcontroller 30 can acquire information such as charge and discharge voltages and temperature of the battery cell 1, the presence or absence of the charger to be attached, and the presence or absence of a charge voltage to be applied.

The fuel gauge 39 is a circuit that counts the amount of current flowing into the battery cell 1 from the voltage between the input terminals CSP and CSN and accumulates current values. The accumulated current value is output to the CPU 31 and is used to calculate the remaining capacity of the battery cell 1. The internal configuration of the fuel gauge 39 will be described later with reference to FIG. 14.

The I/O port 40 is used for data input to or output from various input/output terminals. For example, the I/O port 40 outputs a control signal from the CPU 31 to the output terminal THRM to control operations of the thermistor 3. A communication I/F 41 is an interface circuit used for communication with a device mounted with the battery pack. The communication I/F 41 chiefly receives information needed to display the remaining capacity of the battery cell 1 and transmits the information to the device.

The FET driver 42 is a driver circuit to control operations of the protection switches SW1 and SW2 for discharge and charge control. The FET driver 42 operates based on control signals from the CPU 31 and the overcurrent detection circuit 20.

In the integrated processing circuit 2, the microcontroller 30 implements processes to display the remaining capacity of the battery cell 1. In addition, the protection function of the battery cell 1 is mainly implemented under control of the microcontroller 30. Specifically, the microcontroller 30 uses the information such as voltages and temperatures acquired by the AD converter 38 to detect overcharge and over-discharge states of the battery cell 1. The microcontroller 30 controls the protection switches SW1 and SW2 for charge and discharge and the like to protect the battery cell 1 against these abnormal states.

To implement the protection function, the microcontroller 30 needs to stably operate without malfunction. During normal operations, however, the microcontroller 30 duly uses output voltages of the battery cell 1 as a power source. Output voltages of the battery cell 1 greatly vary with situations. It is difficult to stably operate the microcontroller 30. In order to solve this problem to stably operate the microcontroller 30, the present invention controls startup operations of the microcontroller 30 according to output signals from the reset circuits 13 and 14 in the power supply circuit 10. In addition, the present invention selects a voltage as a power source supplied from the battery cell 1 and the charger connected to the battery pack in accordance with states of the battery cell 1. In this manner, peripheral circuits such as the power supply circuit 10 and the like and the microcontroller 30 into a single chip.

[Startup Control of the Microcontroller]

The following describes control operations at startup as a precondition for stably operating the microcontroller 30.

Stable operations need to be ensured for the microcontroller 30 because it controls the protection function for the battery cell 1. However, the secondary battery may be subject to a remarkable decrease in the cell voltage due to self-discharge and a short circuit due to overcurrent. Such voltage decrease may cause a voltage supplied to the microcontroller 30 from the power supply circuit 10 to be lower than the operating voltage (3.4 V in the embodiment) of the microcontroller 30. In this case, the microcontroller 30 cannot operate stably. If the battery cell 1 is left unused for a long time, the battery voltage may decrease to 0 V. In this case, the battery cell 1 cannot be charged under control of the microcontroller 30.

To stably operate the microcontroller 30, for example, it may be possible to further reduce the minimum operating voltage of the microcontroller 30 to a smaller value (e.g., 1.8 V). This method can decrease the possibility of causing unstable operations of the microcontroller 30. However, the method cannot solve unstable states of the microcontroller 30 nor ensure stable operations of the protection function. Accordingly, the microcontroller 30 needs to be designed so as to stably operate the protection function by always considering the case where the battery cell 1 may be left unused for a long time and the battery voltage may approximate 0 V.

The following describes an example of the embodiment by assuming the case where the cell voltage becomes 0 V. Similar control is provided when the cell voltage decreases to stop the microcontroller 30 (shutdown state).

Figure 6:
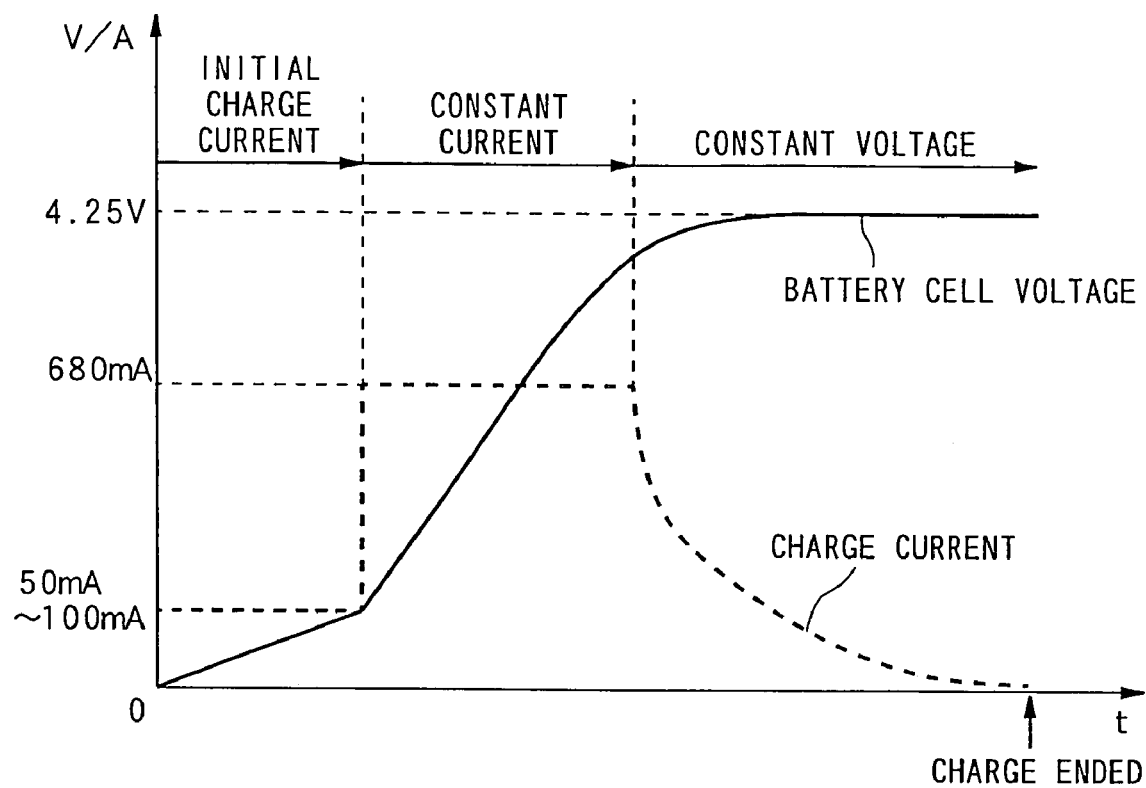
FIG. 6 is a graph showing voltage changes of the battery cell during charge.

FIG. 6 is a graph showing voltage changes of the battery cell 1 during charge.

When the battery cell 1 is charged, a charger is connected to the positive electrode terminal Eb1 and the negative electrode terminal Eb2. FIG. 6 shows not only changes in the cell voltage charged from 0 V, but also changes in output current values from the charger.

When the cell voltage is extremely low such as 0 V, the battery cell 1 may be deteriorated or may be subject to a small amount of short-circuiting between electrodes inside, causing a problem with reliability and safety. In consideration for this, as shown in FIG. 6, it has been a conventional practice to set the charge current to as low as approximately 50 through 100 mA supplied from the charger during a specified time period immediately after the charge startup. Since an initial charge current is applied in this manner, the cell voltage gently increases. After the specified time period, the changer shifts to a normal operation and outputs a constant current of 680 mA. The lithium-ion secondary battery cell used for the embodiment reveals a discharge capacity of 680 mAh according to the 5-hour capacitance measurement. The cell is charged at a constant current of 1 C (680 mA). When the cell voltage reaches 4.25 V, i.e., a voltage for overcharge detection, the protection switch SW2 turns off (or output control is provided from the charger) to keep the cell voltage at 4.25 V thereafter.

According to the embodiment, the microcontroller 30 is supplied with the 3.4 V power supply voltage. The battery cell 1 is supplied with the 4.2 V fully charged voltage and the 3.0 V discharge termination voltage. Accordingly, the discharge termination voltage is lower than the power supply voltage of the microcontroller 30. The discharge voltage of the battery cell 1 needs to be boosted and supplied to the microcontroller 30. For this reason, the power supply circuit 10 is provided with the charge pump circuit 11 and the linear regulator 12. That is to say, a voltage input to the charge pump circuit 11 is boosted twice or 1.5 times. The voltage is regulated to 3.4 V in the linear regulator 12.

Further, it is necessary to provide timing to stably start and operate the microcontroller 30. For this purpose, the reset circuits 13 and 14 are provided to use a comparator to compare output voltages from the linear regulator 12 with the reference voltage.

FIGS. 7A through 7C show relationship among output signals from the reset circuits 13 and 14, and power supply voltages of the battery cell 1 and the microcontroller 30.

The charger is connected to the positive electrode terminal Eb1 and the negative electrode terminal Eb2 to start charging. As shown in FIG. 6, the charger supplies the initial charge current of 50 through 100 mA. Consequently, as shown in FIG. 7A, the cell voltage gradually increases. When the cell voltage reaches 1.2 V, for example, the power supply circuit 10 starts. At this time, the charge pump circuit 11 boosts the input voltage twice. As shown in FIG. 7B, the microcontroller 30 is supplied with the voltage of 2.4 V (timing T41).

The power supply circuit 10 is configured to start when the voltage supplied to the microcontroller 30 reaches the minimum voltage Vpor (2.7 V) for starting the microcontroller 30 or reaches a voltage slightly lower than the minimum voltage. After the charge starts, the cell voltage may unstably increase due to short circuit between contacts of the battery cell 1 or a small amount of short circuit inside the cell. In consideration for this, the capacitance of the capacitor C1 connected to the output side of the linear regulator 12 is configured to offset the voltage fluctuation and stabilize an output voltage.

When the output voltage from the power supply circuit 10 does not reach the voltage Vpor, the signals POR and PFW from the reset circuits 13 and 14 both go to the H level as shown in FIG. 7C. When the output voltage from the power supply circuit 10 reaches the voltage Vpor thereafter, the signal POR from the reset circuit 13 goes to the L level (timing T42). This timing is used to provide the microcontroller 30 with a reset timing. The microcontroller 30 starts when the supplied power supply voltage reaches around the voltage Vpor. Since the applied voltage is insufficient, the microcontroller 30 may continue to operate unstably and, in consequence, behave erratically. To solve this problem, the system of the microcontroller 30 is reset at the timing when the signal POR goes to the L level. This makes it possible to reliably stabilize subsequent operations of the microcontroller 30.

At the above-mentioned timing T42, for example, the system is configured to initialize only registers in the CPU 31 or the RAM 34 and not initialize the battery cell 1 for protection processes. As the cell voltage further increases, the voltage supplied to the microcontroller 30 reaches Vpfw (3.0 V), i.e., the minimum voltage to stably operate the microcontroller 30. At this time, the signal PFW from the reset circuit 14 goes to the L level (timing T43). It is determined that the microcontroller 30 is capable of normal operations. The system starts reading configuration values for protecting the battery cell 1. The protection function starts operating.

As mentioned above, the microcontroller 30 does not start until the power supply voltage supplied to the microcontroller 30 reaches a value sufficient for the startup. The microcontroller 30 is automatically initialized immediately after the startup. Further, the microcontroller 30 does not start the protection process of the battery cell 1 until the power supply voltage reaches a value to enable stable operations. This control prevents the microcontroller 30 from starting in an unstable state to behave erratically and operating the protection function incorrectly. In addition, such control is implemented through the use of minimal analog circuits such as the reset circuits 13 and 14. The circuitry can be easily integrated on the same semiconductor substrate as the microcontroller 30.

When the cell voltage is set to 0 V or a similar state, a voltage supplied from the power supply terminal CPin1 cannot start the microcontroller 30. After the charge starts, however, the charger stably supplies its output. When the cell voltage is smaller than or equal to a specified value (e.g., 2.2 V) in the above-mentioned integrated processing circuit 2, the system starts the microcontroller 30 using a charger's output voltage, i.e., a voltage supplied from the power supply terminal CPin2.

Figure 8A:
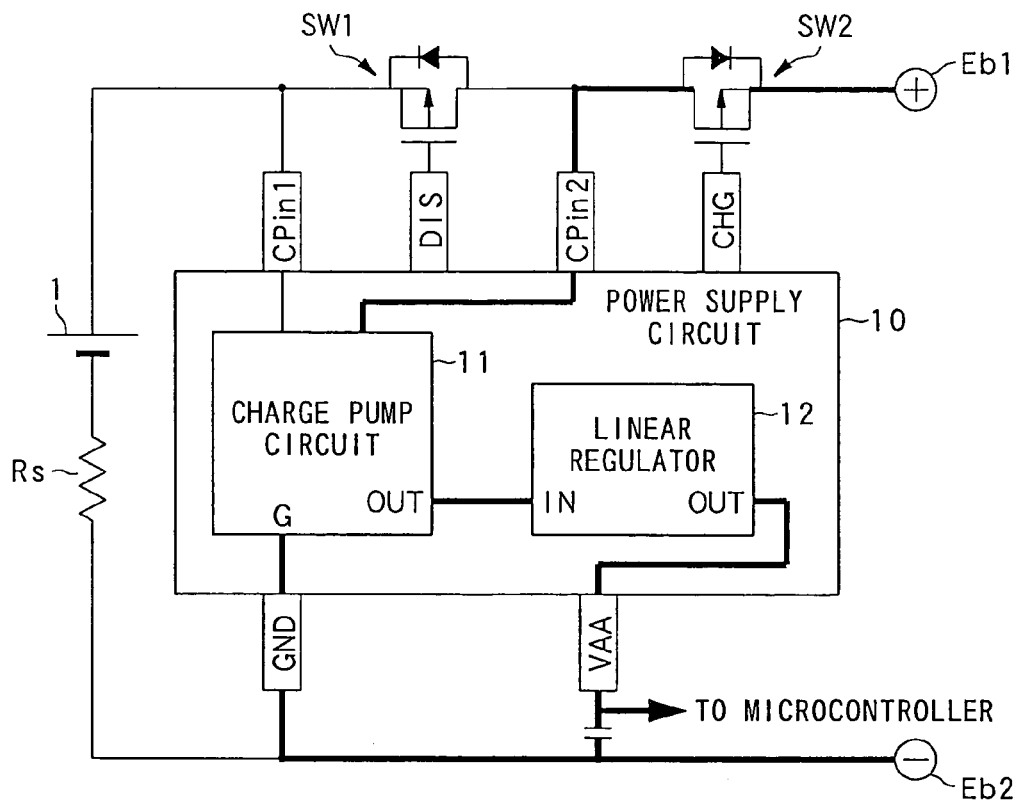
FIGS. 8A and 8B schematically show paths of the power supplied during startup and stable operations of the microcontroller.
Figure 8B:
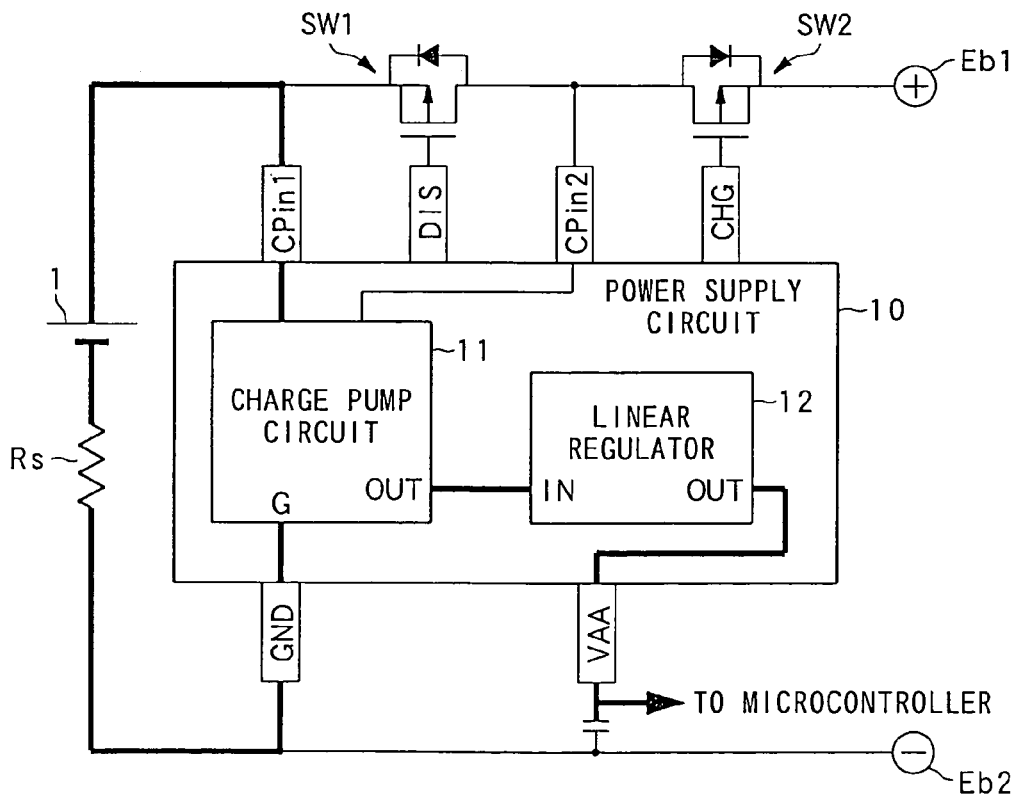

FIGS. 8A and 8B schematically show paths of the power supplied during startup and stable operations of the microcontroller 30.

FIG. 8A shows a power supply path when the charge starts with the cell voltage set to 2.2 V or smaller. At this time, the microcontroller 30 is in inactive (shutdown) state. The protection switches SW1 and SW2 are both turned on. When the power supply terminal CPin2 is selected for input to the charge pump circuit 11, the microcontroller 30 can be supplied with the power and start.

After the microcontroller 30 starts, a time period is needed until the power supply voltage stabilizes in some degree. During this period, the microcontroller 30 operates on a voltage supplied from the charger. The CPU 31 performs a process to detect that the cell voltage reaches the specified value (2.5 V in the embodiment) based on an output signal from the AD converter 38. At this time, the power supply terminal CPin1 is selected for input to the charge pump circuit 11. The charge pump circuit 11 is supplied with an output voltage from the battery cell 1 as shown in FIG. 8B. This voltage generates a power supply voltage for the microcontroller 30. In this manner, the power supply terminal CPin1 is selected for input to the charge pump circuit 11 when the operation becomes stable after the startup. If the charger is removed, the microcontroller 30 can be continuously supplied with the power from the battery cell 1.

The detection voltage is used to provide a timing to select the power supply terminal CPin1 for input to the charge pump circuit 11. It is desirable to set the detection voltage higher than the cell voltage (2.5 V in the embodiment) for the microcontroller 30 to determine that the battery cell 1 is in an over-discharge state (to be described). This makes it possible to stably operate the microcontroller 30.

Figure 9:
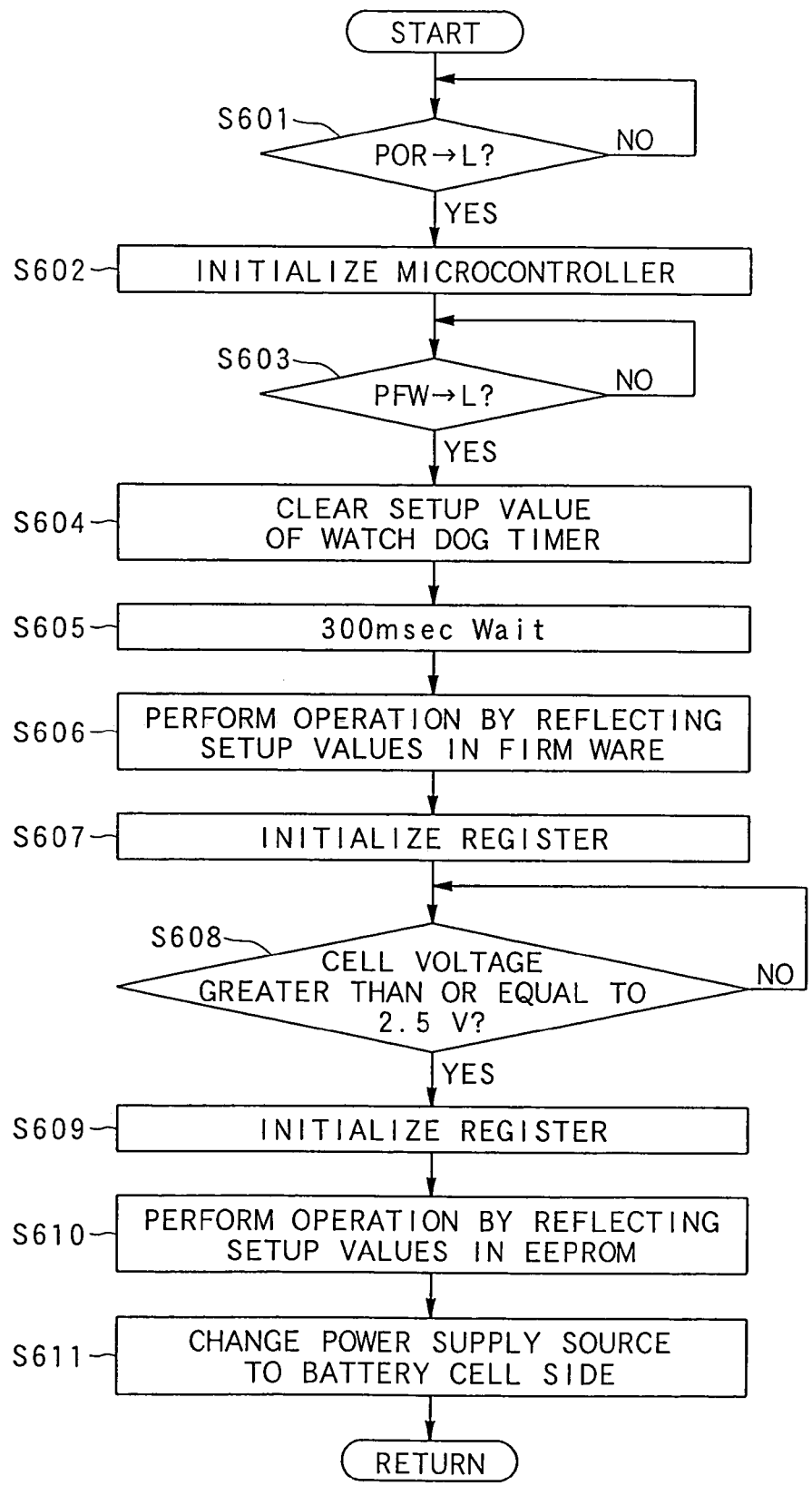
FIG. 9 is a flowchart showing a microcontroller process immediately after startup.

FIG. 9 is a flowchart showing a process of the microcontroller 30 immediately after startup.

When the signal POR from the reset circuit 13 goes to the L level at step S601, the process proceeds to step S602. At step S602, the microcontroller 30 starts to initialize registers in the CPU 31 and the RAM 34. At this time, the system performs only a minimal process needed after startup of the microcontroller 30 and does not start the protection process of the battery cell 1.

At step S603, the process monitors the level of the signal PFW from the reset circuit 14. When the signal PFW goes to the L level, the CPU 31 performs normal processes for the microcontroller 30 such as protecting the battery cell 1 and calculating the remaining battery capacity. The program performs the following initial processes.

At step S604, the process clears the configuration value of the watch dog timer 37. The watch dog timer 37 contained in the microcontroller 30 has a function of protecting the microcontroller 30 against erratic operations. During the startup according to an increase in the power supply voltage, initial settings may not be cared for not only the microcontroller 30, but also the watch dog timer 37. This state needs to be prevented to realize the protection function of the battery cell 1 by mainly using the microcontroller 30 itself. Immediately after the microcontroller 30 starts, it is effective for stable operations of the microcontroller 30 to clear configuration values of the watch dog timer 37 such as the time interval to determine an erratic operation and enable the watch dog timer 37. When the initial configuration values are cleared, the watch dog timer 37 transmits an enable signal to the CPU 31 to notify that the watch dog timer 37 is enabled.

At step S605, the timer 36 is allowed to count a time interval of 300 msec from the timing when the signal PFW goes to the L level at step S603. During this period, the microcontroller 30 is forced into a wait state. At this step, as shown in FIG. 7B, a power supply voltage supplied to the microcontroller 30 may further increase after the startup. The microcontroller 30 needs to be operated stably by increasing the power supply voltage as much as possible. For this purpose, the microcontroller 30 is placed in the wait state long enough for the instruction clock frequency of the microcontroller 30. Then, the following process is performed.

At step S606, the process reflects various configuration values allocated to the active software to start execution of the protection process against abnormal states of the battery cell 1 such as overcharge and over-discharge. The configuration values to be reflected include, for example, voltages and temperatures of the battery cell 1 in order to detect abnormal states such as overcharge and over-discharge. These states are detected according to values input to the AD converter 38. At step S607, the process initializes register values configured for the inside of the microcontroller 30 such as CPU 31.

Under its own control, the microcontroller 30 implements the protection function of the battery cell 1. Various configuration values for the protection function can be freely changed by using nonvolatile memory (the EEPROM 35 in the embodiment). The manufactured microcontrollers 30 each may have different characteristics. The nonvolatile memory can store values reflecting correction values for the various configuration values corresponding to each of the microcontrollers 30. It is also possible to use the stored value to operate the microcontroller 30. Further, as will be described later, the microcontroller 30 may stop due to a decreased cell voltage. In consideration for this, immediately before the microcontroller 30 stops (e.g., when the cell voltage becomes lower than a specified voltage), the nonvolatile memory stores various configuration values needed for processes after the restart. After the restart, the stored configuration values can be read to be used for the processes.

However, some length of time is needed to read the configuration values stored in the nonvolatile memory and reflect them on operations of the CPU 31. This is inappropriate for the purpose of stably operating the protection function immediately after the startup. To solve the problem, the CPU 31 is allowed to operate using configuration values preset in the active software immediately after the microcontroller 30 starts. That is to say, the configuration values used for this stage are prestored in the program memory 32. These values are read into the CPU 31 with the progress of software execution in the program memory 32. At a specified timing later, the CPU 31 rereads the configuration values stored in the nonvolatile memory for operations. Under such control, the protection function can be continuously and stably operated immediately after the startup. Further, it is possible to improve the degree of freedom of each value and provide it with versatility.

The configuration values stored in the nonvolatile memory may be reflected at a timing when the power supply voltage of the microcontroller 30 reaches a specified value, for example. That is to say, at step S608, it is determined whether or not the power supply voltage supplied to the microcontroller 30 becomes greater than or equal to 2.5 V based on the cell voltage detected by way of the AD converter 38. If the result is affirmative, the process proceeds to step S609. At step S609, the process initializes registers needed to change the configuration values. At step S610, the process reflects the configuration values read from the EEPROM 35 and continues the protection process for the battery cell 1. Thereafter, the microcontroller 30 changes to the normal operation state. At step S611, the process selects the power supply terminal CPin1 for input to the charge pump circuit 11 to be powered from the battery cell 1.

The above-mentioned process makes it possible to reliably and stably start and operate the microcontroller 30 and accurately operate the protection function even if the cell voltage decreases down to too small a value to drive the microcontroller 30.

[State Transition Control of the Battery Cell]

The following describes in detail how the microcontroller 30 controls the protection function for the battery cell 1. The protection function allows the AD converter to detect a cell voltage value and keep track of a state. The microcontroller 30 stably implements a process appropriate to the state mainly under software control.

Figure 10:
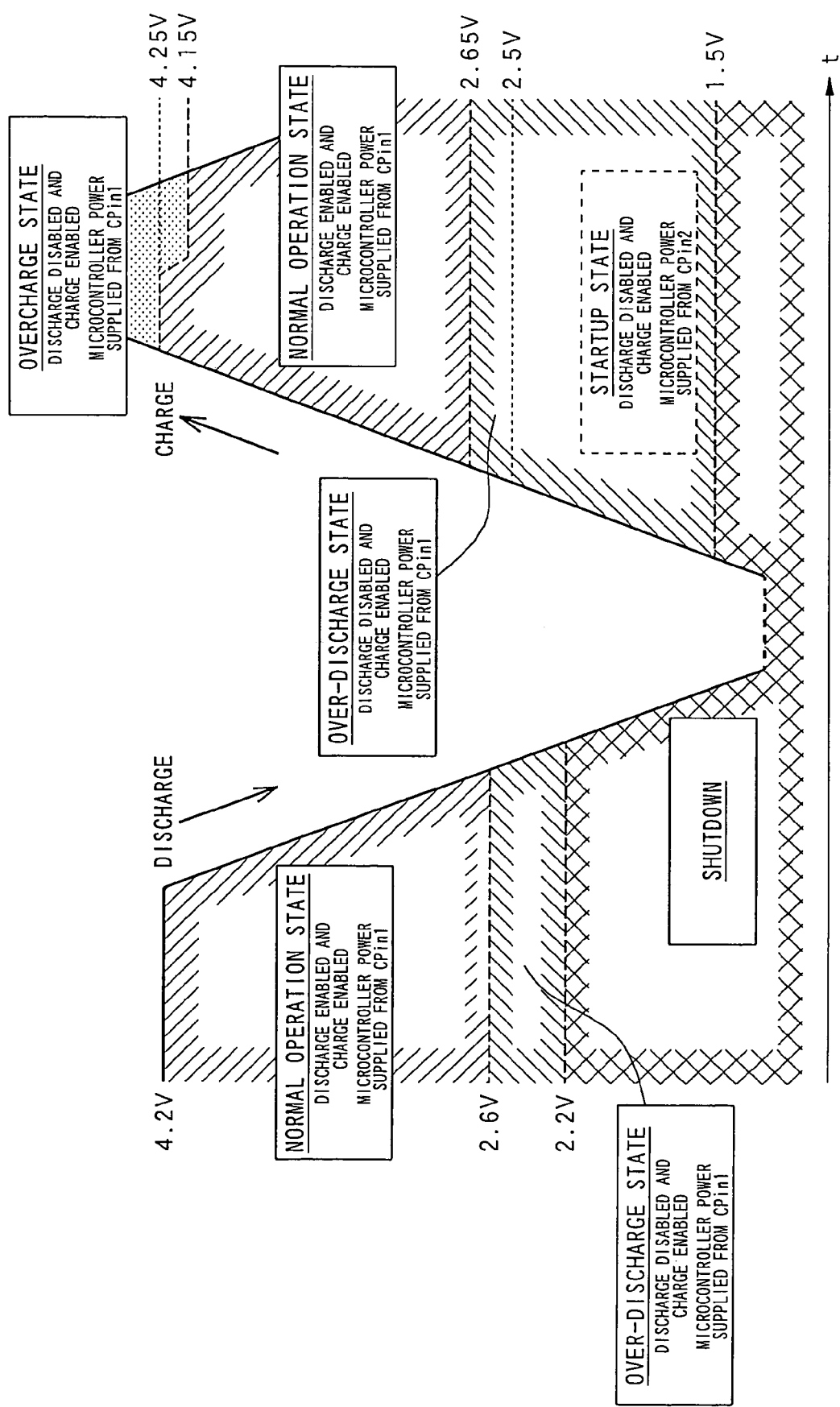
FIG. 10 shows state transition of battery cell voltages.

FIG. 10 diagrams state transition in accordance with cell voltages.

FIG. 10 chronologically shows states dependent on cell voltage changes from a starting point when the battery cell 1 is fully charged. A secondary battery requires that the cell voltage should be within a specified range during normal use so as not to shorten the life, degrade the capacity, or degenerate the quality of the battery itself. It is recommended to use the lithium-ion secondary battery within cell voltages between 3.0 and 4.2 V. With reference to the cell voltage, overcharge and over-discharge states are defined above and below the normal operation state approximately corresponding to the above-mentioned range of cell voltages. The overcharge state signifies an excessive cell voltage. The over-discharge state signifies an insufficient cell voltage.

As shown in FIG. 10, in the normal operation state, the battery cell 1 is fully charged, for example. The normal operation state permits both further charges from the charger and discharges due to connection to a discharge load. That is to say, the protection switches SW1 and SW2 are turned on under control of the microcontroller 30. When a discharge causes the cell voltage to be smaller than or equal to the specified value from this state, the over-discharge state takes effect to disable any discharge so as to protect the battery cell 1. The protection switch SW1 is turned off.

Since the microcontroller 30 itself operates on the cell voltage as a power source, further decreasing the cell voltage disables the microcontroller 30 from operating. At this time, the state changes to a shutdown state to stop the microcontroller 30.

As mentioned above, connecting the charger increases the cell voltage to some extent to start the microcontroller 30. After the startup, the state changes to the over-discharge state. Immediately after the startup, a startup process state takes effect to perform the startup process as described with reference to FIG. 9. In this state, only the charge is permitted to turn the protection switches SW1 and SW2 off and on, respectively. The power supply source is set to the charger side (i.e., the power supply terminal CPin2). When the charge causes the cell voltage to be greater than or equal to the specified value, the power supply source changes to the power supply terminal CPin1. The battery cell 1 operates as power supply. When the cell voltage further exceeds the specified value, the normal state is resumed. The protection switch SW1 also turns on to permit both the charge and the discharge.

After the battery cell 1 is fully charged, further continuing the charge changes the state to the overcharge state. The protection switch SW2 turns off to permit only the discharge.

The overcharge state changes to the normal state when the discharge causes the cell voltage to be smaller than or equal to the specified value.

In the above-mentioned state transition, the characteristics of the battery cell 1 are taken into full consideration to configure cell voltage values that determine transition to the states. Accordingly, different threshold values may need to be used depending on directions to change the states. Since the processes corresponding to the state transition are performed under software control, it becomes possible to easily fine-tune the threshold values without using complicated circuits.

In addition to the above-mentioned states, the state may change to the overcurrent state in which an excessive discharge current results from short-circuit between electrodes or in the cell. The overcurrent detection circuit 20 determines transition to the overcurrent state. The microcontroller 30 controls the restoration from this state.

Figure 11:
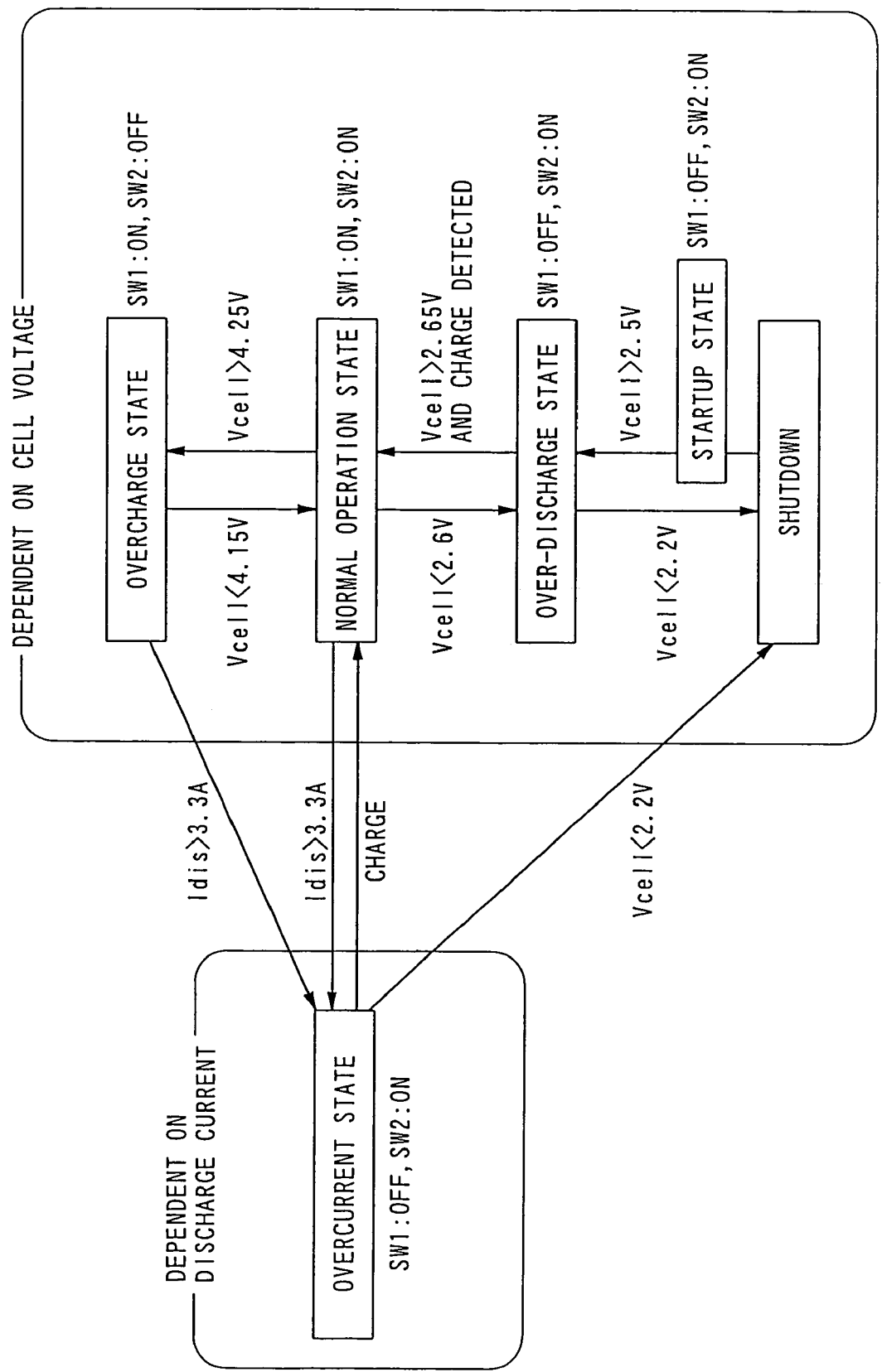
FIG. 11 shows in detail a flow of state transition control.

FIG. 11 shows in detail a flow of state transition control. With reference to FIG. 11, the following describes specific threshold values for cell voltages and discharge currents and necessary processes during the state transition.

(1) Detecting the Overcharge State and Restoration

The CPU 31 of the microcontroller 30 determines the overcharge state of the battery cell 1 based on cell voltage Vcell detected via the AD converter 38. As shown in FIG. 11, the overcharge state is detected when the cell voltage Vcell reaches 4.25 V. The FET driver 42 changes a control voltage to be output to an output terminal CHG to turn off the protection switch SW2. This forcibly stops charging the battery cell 1.

Concurrently with this process, the CPU 31 writes transition to the overcharge state as a state transition log in the EEPROM 35. For example, the log can be used to correct calculated values according to error occurrences or detect failures in the battery cell 1 during a remaining battery capacity calculation process for the battery cell 1.

The microcontroller 30 detects transition to the normal state from the overcharge state when the cell voltage Vcell becomes lower than 4.15 V. The protection switch SW2 is returned to the on-state. The same detection voltage may be used for transition to the overcharge state and restoration to the normal operation state. When transition to the overcharge state turns off the protection switch SW2, the cell voltage Vcell immediately decreases to detect transition to the normal operation state. This restarts the charge. The cell voltage Vcell increases again to change to the overcharge state, causing a hunting condition that repeats the transition between the overcharge and normal operation states. To prevent this situation, a detection voltage for restoration to the normal operation state is set to be lower than a detection voltage during the transition with reference to 4.2 V, i.e., the fully charged voltage of the lithium-ion secondary battery.

According to the above-mentioned process, the microcontroller 30 can accurately detect occurrence of the overcharge state and stop the charge operation. It is possible to reliably prevent such situations as separation of ion at an electrode of the battery cell 1 or smoking and ignition, thus ensuring the safety. It is also possible to detect a failure in the charger connected to the battery pack.

In the above-mentioned description, the state transition is detected based only on the cell voltage Vcell. In addition, the safety can be further enhanced by using temperature information about the battery cell 1 for detection of the state transition. The temperature information is detected by the thermistor 3 and is acquired from the AD converter 38. For example, no charge is allowed when a temperature information value exceeds 60° C. Alternatively, it may be preferable to decrease the threshold voltage approximately 0.1 V to detect an overcharge when a temperature information value exceeds 60° C.

(2) Detecting the Over-Discharge State and Restoration

Transition from the normal operation state to the over-discharge state is detected when the cell voltage Vcell becomes lower than 2.6 V. This detection turns off the protection switch SW1 to cut off the discharge current. Like transition to the overcharge state as mentioned above, transition to the over-discharge state is written as a log to the EEPROM 35.

The lithium-ion secondary battery uses the discharge termination voltage set to 3.0 V When a device operates using the battery cell 1 as a power supply, the device may be configured to stop operating upon detection of the discharge termination voltage. The microcontroller 30 uses the detection voltage to detect the over-discharge state. If this detection voltage is set to be equal to the discharge termination voltage, a timing to stop operating the connected device corresponds to a timing to turn off the protection switch SW1. The process to stop operating the device may not be completed normally, causing errors. To solve this problem, the over-discharge state detection voltage is set to be slightly lower than the discharge termination voltage. After the device stops operating normally, the protection switch SW1 turns off to cut off the discharge current.

When the state changes to the over-discharge state, the cell voltage Vcell may further decrease to cause transition to the shutdown state that stops the microcontroller 30 from operating. In consideration for this, the EEPROM 35 stores information needed for later restart of the microcontroller 30 at the time point of transition to the over-discharge state. Such information includes values temporarily stored in the RAM 34 of the microcontroller 30, for example. The CPU 31 reads the stored information at a timing when the power supply voltage is stably supplied to the microcontroller 30 after its restart. The information can be used for operations (corresponding to step S610 in FIG. 9).

On the other hand, transition from the over-discharge state to the normal operation state is determined when detecting that the cell voltage Vcell becomes higher than 2.65 V and also the charger is connected for charging in progress. It is known that the lithium-ion secondary battery temporarily increases the cell voltage immediately after the discharge stops. Consequently, if the same value is used for the detection voltage to detect transition from the normal operation state to the over-discharge state and the detection voltage to detect restoration to the normal operation state, there may be a case of causing the hunting condition that repeats the transition between these states. To reliably prevent occurrence of the hunting, some length of time is needed between transition to the over-discharge state and restoration to the normal operation state. For this purpose, the detection voltage to detect restoration to the normal operation state is set to be slightly higher than the detection voltage to detect the over-discharge state. In addition, the state is not restored to the normal operation state until the charge starts.

To detect the charge start, the CPU 31 acquires a signal level from the input terminal PCKP and a voltage value at the input terminal HVIN via the AD converter 38 for determination. The input terminal PCKP is used to detect the charger connection. The input terminal HVIN is connected to the positive electrode terminal Eb1.

According to the above-mentioned process, the microcontroller 30 can accurately detect occurrence of the over-discharge state and stop the discharge operation. This makes it possible to reliably prevent a small amount of short-circuit inside the electrode and capacity degradation. Further, it is possible to ensure the safety and prevent the life of the battery cell 1 from being shortened.

(3) Detecting the Shutdown State and Restoration

When the cell voltage Vcell further decreases from the over-discharge state, the microcontroller 30 cannot operate. The discharge current is cut off in the over-discharge state. Accordingly, the cell voltage Vcell slowly decreases due to power consumption of the microcontroller 30 and the power supply circuit 10. To prevent the battery cell 1 from being discharged further, the microcontroller 30 changes to the shutdown state to stop operating when the cell voltage Vcell becomes smaller than 2.2 V.

In this state, the microcontroller 30 cannot start using the battery cell 1 because the cell voltage Vcell decreases. The power supply terminal CPin2 needs to be selected for input to the charge pump circuit 11 so as to be supplied with power from the charger at the next startup.

As shown in FIG. 9, the shutdown state restores to the over-discharge state based on the reset timing and the startup process initiation timing provided by the reset circuits 13 and 14 in accordance with an increase in the voltage supplied to the microcontroller 30. Immediately after the start, the microcontroller 30 operates using a voltage from the charger as the power supply. When the voltage stabilizes to some extent, e.g., when the cell voltage Vcell exceeds 2.5 V, the power supply terminal CPin1 is selected for input to the charge pump circuit 11. The state completely restores to the over-discharge state.

The above-mentioned process can minimize a power decrease in the battery cell 1. The microcontroller 30 can start normally after the charge starts. The protection process for the battery cell 1 can start stably.

(4) Detecting the Overcurrent State and Restoration

If contacts of the battery cell 1 are short-circuited, an excessive discharge current may flow to cause the battery cell 1 to be heated abnormally. To prevent this problem, the resistor Rs is used to detect a discharge current. When an overcurrent occurs, the protection switch SW1 is turned off to cut off the discharge current.

The overcurrent detection circuit 20 is used to detect an overcurrent and control the protection switch SW1. The overcurrent detection circuit 20 is provided as special hardware independently of the microcontroller 30. The reason is the need for fast and stable changeover to the protection switch SW1 when a short circuit occurs. Assuming that the microcontroller 30 detects, under software control, an occurrence of overcurrent due to short circuit. An interrupt occurs in the microcontroller 30 after the short circuit occurs. The instruction clock of the microcontroller 30 operates. Depending on an instruction state of the microcontroller 30 immediately before the start of the interrupt process, the time to provide control to turn off the protection switch SW1 changes and may cause a large delay. Accordingly, the protection switch SW1 needs to be operated independently of instruction states in the microcontroller 30.

As will be described later, starting the charge triggers restoration from the overcurrent state. When the overcharge state changes to the overcurrent state, the protection switch SW2 also turns on to enable the charge. The control to turn on the protection switch SW2 may be directly provided by the overcurrent detection circuit 20 like the control to turn off the protection switch SW1 or may be provided by the process of the CPU 31 after transition to the overcurrent state.

Figure 12:
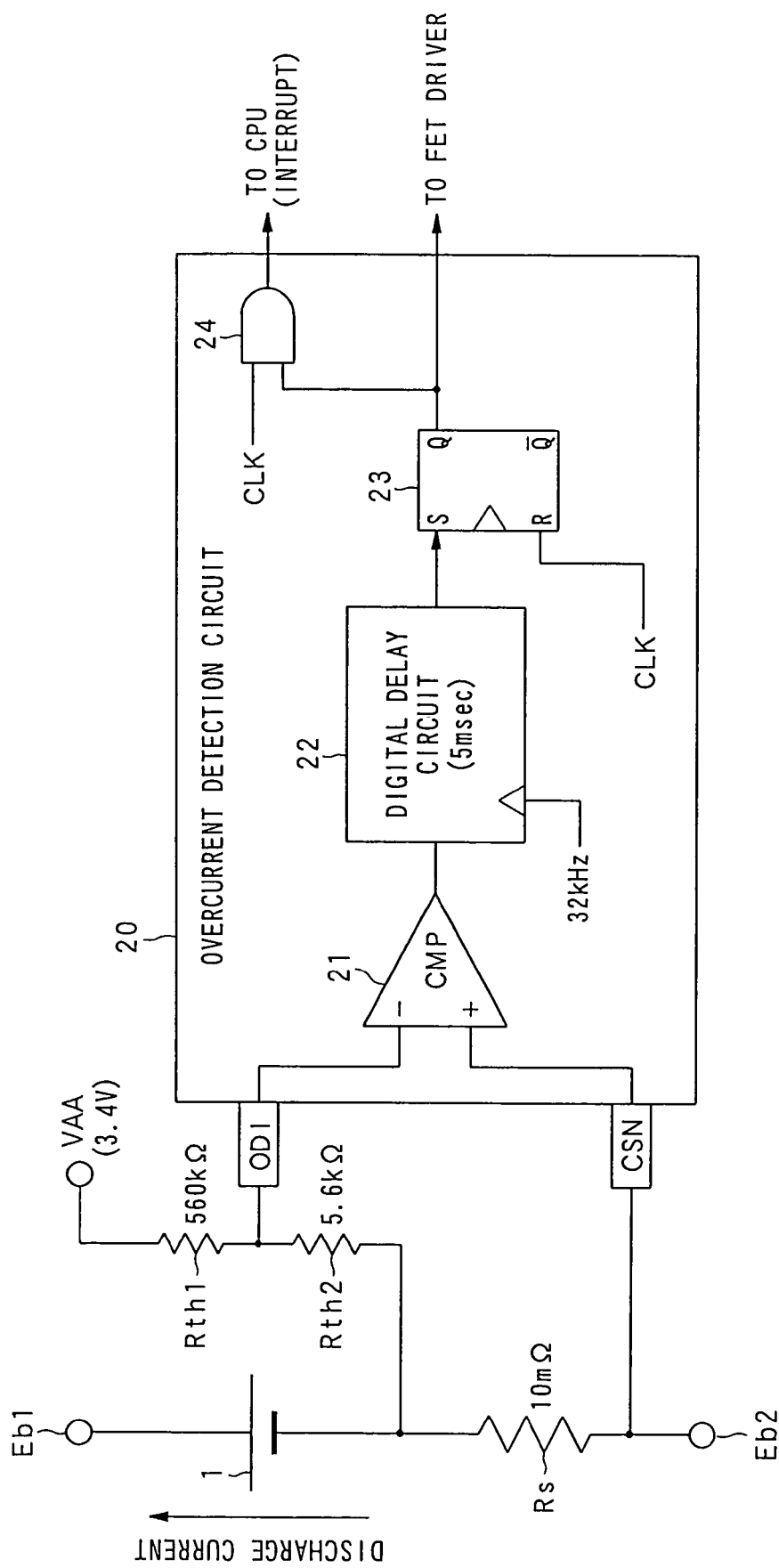
FIG. 12 shows an internal configuration example of an overcurrent detection circuit.

FIG. 12 shows an internal configuration example of the overcurrent detection circuit 20.

As shown in FIG. 12, the overcurrent detection circuit 20 comprises a comparator 21, a digital delay circuit 22, a latch circuit 23, and an AND gate circuit 24. Input terminals of the comparator 21 are connected to the input terminals ODI and CSN, respectively. The comparator 21 sets an output signal to the H level when a voltage between the input terminals is greater than or equal to a specified value. In this example, a threshold value of 3.4 A is specified to detect transition to the overcurrent state. Resistance values of the resistors Rth1 and Rth2 are configured to be capable of voltage comparison in the comparator 21 against the threshold current of 3.4 A.

The digital delay circuit 22 delays an output signal from the comparator 21 as long as 5 msec. The digital delay circuit 22 resets an output signal when an input signal changes to the L level within 5 msec from the rise timing of the H level. In this manner, the digital delay circuit 22 is prevented from detecting a momentary overcurrent of 5 msec or less.

The latch circuit 23 latches an output from the digital delay circuit 22 based on a clock signal from a clock oscillator 44$a$ or 44$b$. The latched signal is supplied to the FET driver 42. When this signal goes to the H level, the protection switch SW1 is forcedly turned off. The latched signal is further supplied to the CPU 31 via the AND gate where the clock signal is input at the other input terminal. This signal interrupts the CPU 31.

The overcurrent detection circuit 20 can fast turn off the protection switch SW1 based on overcurrent detection by the comparator 21 independently of instruction states of the microcontroller 30. This can enhance the effect of protecting the battery cell 1.

Electronic devices such as video cameras and digital still cameras use motors to drive lenses and take up the tape. It is known that driving the motor momentarily generates a very large rush current. Similar rush current also occurs when a strobe light is used. The use of the comparator 21 can fast detect an overcurrent. However, an occurrence of rush current may be incorrectly assumed to be an occurrence of overcurrent to turn off the protection switch SW1. To avoid this situation, the digital delay circuit 22 is used so as not to detect a momentary overcurrent of 5 msec or less. This can prevent malfunctioning due to a rush current and ensure stable operations of the protection function.

Detecting an overcurrent allows the overcurrent detection circuit 20 to interrupt the microcontroller 30. When detecting an occurrence of interrupt, the CPU 31 of the microcontroller 30 writes a state indicative of the overcurrent occurrence in the register (RAM 34 in this example) to store abnormal states. After the interrupt occurs, the CPU 31 can read configuration values from the register to recognize the overcurrent occurrence. This makes it possible to smoothly perform a subsequent restoration process from the overcurrent state under control of the microcontroller 30. The read configuration values are recorded in the EEPROM 35 as a log and can be used for failure detection. If an overcurrent occurs repeatedly, for example, it is possible to determine that a large discharge current is used for a device connected to the battery pack or that the battery cell 1 is highly possibly short-circuited.

Now back to FIG. 11, the following describes the restoration process form the overcurrent state in more detail.

A possible method of restoration to the normal operation state from the overcurrent state is to detect the release of discharge load for automatic restoration. However, let us consider a case where the battery pack is put in a pocket and a metal such as a key contacts with the electrode to cause short-circuit. In such case, the metal and the electrode may repeat contact and separation to cause a fault called chain short-circuit. If the above-mentioned restoration method is used, the battery cell 1 may repeat the overcurrent state and the normal operation state to cause abnormal heating. When an overcurrent occurs, the cell voltage becomes lower than the operating voltage of the microcontroller 30. If this situation is repeated, the microcontroller 30 operates unstably.

In consideration of the foregoing, restoration from the overcurrent state is configured to take place only when the charge is performed as shown in FIG. 11. That is to say, control is provided to restore the overcurrent state to the normal operation state when detection signals from the input terminals PCKP and HVIN detect connection of the charger and application of a charge voltage.

No charge may occur for a long time after detection of an overcurrent. In this case, control is provided to stop operations of the microcontroller 30 when the cell voltage Vcell becomes smaller than 2.2 V.

In the battery pack according to the embodiment of the present invention as mentioned above, the protection function of the battery cell 1 contains the charge current cutoff control in the overcharge state and the discharge current cutoff control in the over-discharge state. These control operations can be stably performed under control of the microcontroller 30. Further, the overcurrent detection circuit 20 detects the overcurrent state and provides the discharge current cutoff control in this state. The overcurrent detection circuit 20 operates independently of the control operations provided by the microcontroller 30. Accordingly, it is possible to reliably perform the operation for protection against an overcurrent.

In this manner, the software control of the microcontroller 30 is mainly used to implement the protection function of the battery cell 1, thus reducing the circuit scale and decreasing manufacturing costs. In addition, it is possible to easily fine-tune the threshold voltage for detecting abnormal states. These advantages enable highly accurate control corresponding to the characteristics of the battery cell 1.

[Microcontroller-Based Optimization of the Battery Cell Protection Process and the Remaining Capacity Calculation Process]

As mentioned above, the protection function for the battery cell 1 is implemented by detecting the overcharge and over-discharge states based on the cell voltage detection. The protection function further detects the overcurrent state based on the discharge current detection to provide the cutoff control over charge currents and discharge currents corresponding to the respective states. For the processes of the microcontroller 30, the CPU 31 acquires cell voltage values via the AD converter 38. The CPU 31 determines the normal operation state, the overcharge state, and the over-discharge state. According to the states, the CPU 31 controls operations of the protection switches SW1 and SW2 via the FET driver 42. It may be preferable to acquire not only the cell voltage, but also information about the temperature of the battery cell 1 detected by the thermistor 3 via the AD converter 38. The temperature information may be used to likewise control operations of the protection switches SW1 and SW2 for protection against abnormal heating.

During these processes, the CPU 31 of the microcontroller 30 reads the information about voltages and temperatures of the battery cell 1 from the AD converter 38 at a specified interval. The CPU 31 performs processes corresponding to the values. For example, let us consider a state in which a device is connected to the battery pack and is supplied with power from the battery cell 1. In order to safely protect the battery cell 1, it is desirable to use as short an interval as possible to read the voltage or the temperature of the battery cell 1 from the AD converter 38.

On the other hand, the microcontroller 30 not only protects the battery cell 1 as mentioned above, but also calculates the remaining capacity of the battery cell 1 and transmits to the device the information calculated through communication with the device. These processes enable a display mounted on the device to display the remaining capacity of the battery cell 1 and the available remaining time.

In order to perform the remaining battery capacity calculation process like the above-mentioned protection process, the CPU 31 needs to acquire the voltage of the battery cell 1, charge and discharge currents, discharge termination voltage (actually approximated by the detection voltage in the over-discharge state), and temperature via the AD converter 38. The remaining battery capacity calculation process further requires the power (current) consumed by the connected device and a discharge termination voltage (minimum operating voltage) uniquely specified for the device. The remaining battery capacity calculation process transmits values calculated based on these pieces of information to the device via the communication I/F 41.

The device uses the battery cell 1 to operate for a relatively long period such as over an hour. For example, successive imaging is available for approximately 10 hours on a video camera or for approximately one hour on a digital still camera. Accordingly, it is preferable to update the display of the remaining battery capacity at an interval of one minute or five to 10 minutes, for example. This can fully satisfy the user-requested display accuracy.

Therefore, the remaining battery capacity calculation process need not transmit calculated values to the device in as short a time as needed for the protection process. In an extreme case, it just needs to perform the remaining battery capacity calculation process and the process of transmitting calculated values to the device only when the processes are needed. In consideration for this, the embodiment performs these processes by issuing an external interrupt to the microcontroller 30 using the communication from the device, for example. At this time, information is acquired from the AD converter 38. An interval of the external interrupts is configured to be longer than the execution interval of the protection processes to stabilize operations and decrease the power consumption.

Calculating the remaining battery capacity requires detecting the power (or current) consumed by device operations or the discharge. In order to perform the remaining battery capacity calculation process at the specified time interval as mentioned above, it is necessary to be able to read detected power consumption values at a specified time interval.

Figure 13:
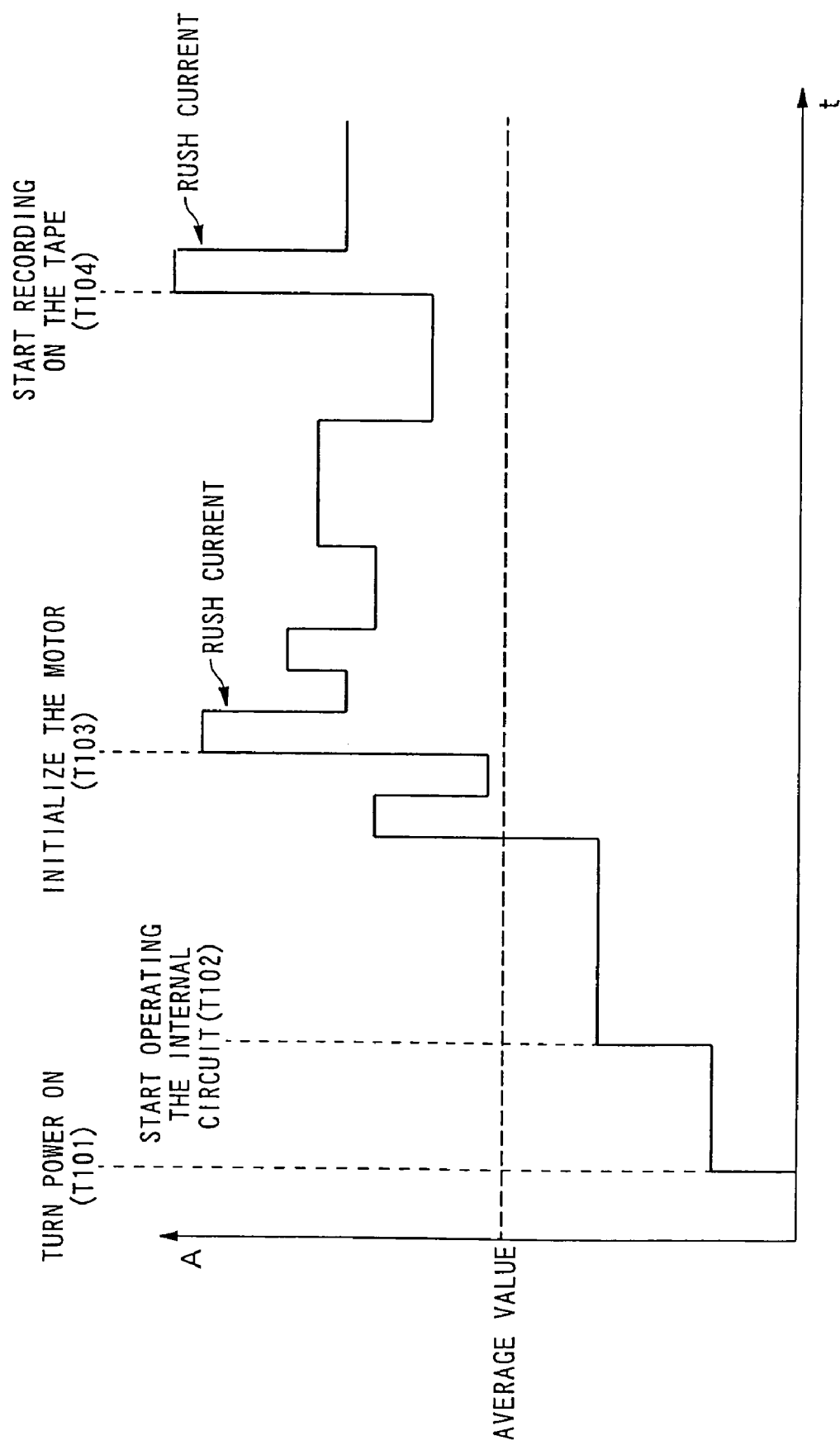
FIG. 13 is a graph showing changes in consumption currents during video camera operations.

The following describes information needed to detect the power consumption. FIG. 13 is a graph showing changes in consumption currents during video camera operations.

FIG. 13 exemplifies changes in currents consumed by a video camera that uses a motor to drive the magnetic tape. The video camera is an example of devices connected to the battery pack. As shown in FIG. 13, the video camera is turned on at timing T101. An internal circuit starts operating at timing T102. Then, the motor is initialized at timing T103. Driving the motor generates a rush current to greatly increase the consumption current momentarily. When recording on the magnetic tape starts at timing T104, the motor is driven to generate a rush current again and increase the consumption current.

In this manner, the consumption current greatly varies in a short period of time while the video camera is operating. For example, a digital still camera is also subject to a large variation in the consumption current due to generation of a rush current when a lens is driven or a strobe light is used. However, it is important to measure a device's average consumption current, not a short-term current change so that the remaining battery capacity can be calculated highly accurately.

Conventionally, in order to detect an average consumption current, the current is converted into a voltage using a resistor inserted serially with the battery cell. A voltage waveform is detected via the AD converter. Calculation is performed to average detected values. However, this method complicates the process to average operations by the microcontroller. A highly accurate operation requires increasing the frequency of the process or enhancing the size of memory to store the detected values. Another available method is to provide a filter at an input side of the AD converter and measure an average value using this filter. However, this method requires an installation area for a relatively large external part and increases manufacturing costs.

Figure 14:
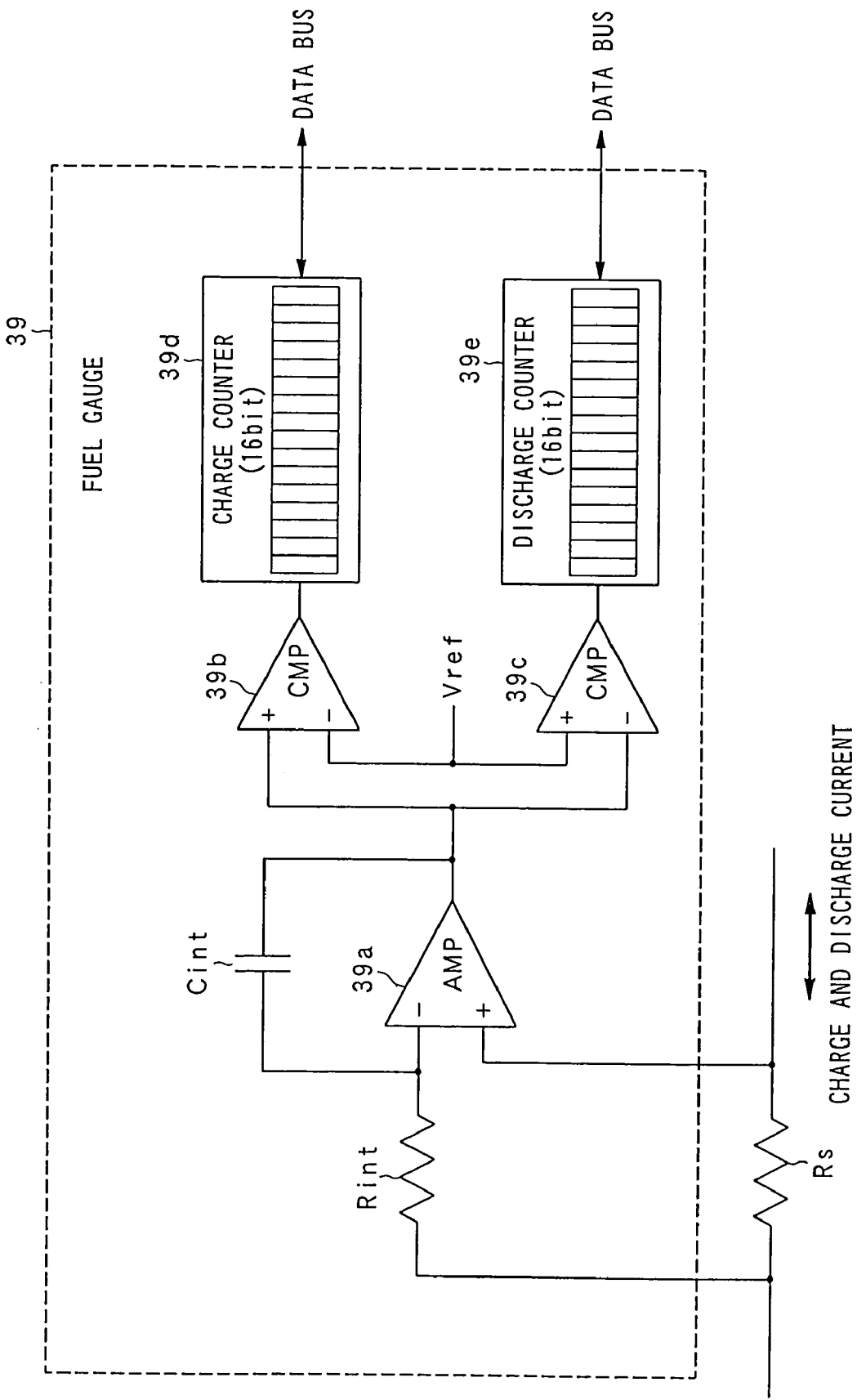
FIG. 14 shows an internal configuration example of a fuel gauge.

By contrast, the embodiment provides the fuel gauge 39 in the microcontroller 30 to detect an average consumption current. This facilitates the process to detect a consumption current by the microcontroller 30. FIG. 14 shows an internal configuration example of the fuel gauge 39.

As shown in FIG. 14, the fuel gauge 39 comprises: a differential amplifier 39a whose input terminals are connected to both ends of the current detection resistor Rs; a capacitor Cint connected between an output terminal and an inverting input terminal of the differential amplifier 39a; a resistor Rint serially inserted between the battery cell side of the resistor Rs and the inverting input terminal of the differential amplifier 39a; comparators 39b and 39c whose inputs are output from the differential amplifier 39a and a reference voltage Vref; and a charge counter 39d and a discharge counter 39e connected to outputs of the comparators 39b and 39c, respectively.

The fuel gauge 39 uses the resistor Rs to detect the consumption current as a voltage. Input to the differential amplifier 39a is inverted and fed back via the capacitor Cint. In this configuration, the differential amplifier 39a operates as an integrator for input voltages. Output from the differential amplifier 39a is input to a positive-phase input terminal of the comparator 39b and an inverting input terminal of the comparator 39c. The reference voltage Vref is input to the inverting input terminal of the comparator 39b and a positive-phase input terminal of the comparator 39c. In this manner, the comparators 39b and 39c perform comparison operations each having reverse polarities.

When a charge current flows, an input voltage from the differential amplifier 39a may exceed the reference voltage. In this case, the comparator 39b resets the input voltage and outputs a pulse signal. When an input voltage to the differential amplifier 39a increases, an output frequency of the comparator 39b increases. The charge counter 39d counts the number of pulses output from the comparator 39b at a specified time interval. This operation measures an accumulated value (electric charge) of the charge current flowing through the resistor Rs during the period. Likewise, when a discharge current flows, an input voltage from the differential amplifier 39a may be smaller than the reference voltage. In this case, the comparator 39c resets the input voltage and outputs a pulse signal. The discharge counter 39e counts the number of pulses output from the comparator 39c at a specified time interval. This operation measures an accumulated value of the discharge current flowing through the resistor Rs.

Using this fuel gauge 39, the microcontroller 30 reads count values of the charge counter 39d and the discharge counter 39e at the specified time interval for conversion into the consumed power and the power charged in the battery cell 1, respectively. The remaining battery capacity calculation process can be performed. The fuel gauge 39 outputs an averaged value of the consumed power or charged power. It is possible to greatly decrease processing loads of the CPU 31 for displaying the remaining battery capacity. In addition, the fuel gauge 39 can be implemented in a simple circuit configuration as shown in FIG. 14, making it possible to reduce the circuit installation area, power consumption, and manufacturing costs. This is advantageous for stably implementing the protection function and the remaining capacity calculation function for the battery cell 1 on the microcontroller 30.

For example, when the voltage of the battery cell 1 decreases very slowly, it is a good practice to extend a unit time for accumulating currents. This makes it possible to accurately detect a consumption current per unit time and improve the accuracy of displaying the remaining battery capacity. However, it is disadvantageous to greatly extending the timing to update the remaining battery capacity display on the device. Consequently, it is desirable to configure an interval for the CPU 31 to acquire consumption current values from the fuel gauge 39 in consideration of a balance between the accuracy of measuring consumption currents and the convenience of remaining battery capacity display. The interval of approximately two seconds is appropriate to supply the power to portable devices such as digital video cameras and digital still cameras. When the device is supplied with the power, the CPU 31 can perform the remaining battery capacity calculation process and the process to transmit calculated values to the device based on the interrupt process at a 2-second interval. The CPU 31 can perform the protection process for the battery cell 1 at a shorter interval.

If the device to be powered is not connected or is turned off, power consumption of the battery cell 1 is very small and the cell voltage decreases very slowly. In this case, the determination of the overcharge or over-discharge state is needed not so frequently as for the power supply to the device. The safety can be ensured if the interval to read voltages and temperatures from the AD converter 38 is set to be sufficiently longer than the instruction clock frequency of the microcontroller 30.

Generally, a time period of several milliseconds is needed to acquire the information about voltages and temperatures of the battery cell 1 via the AD converter 38 and to determine the overcharge or over-discharge state. When the device is not connected or is connected and is turned off, the embodiment allows the CPU 31 to perform the protection process for the battery cell 1 in energy saving mode, greatly reducing the power consumption. The energy saving mode enables the protection process to be performed at the 2-second interval in the same manner as the remaining battery capacity calculation process.

Figure 15:
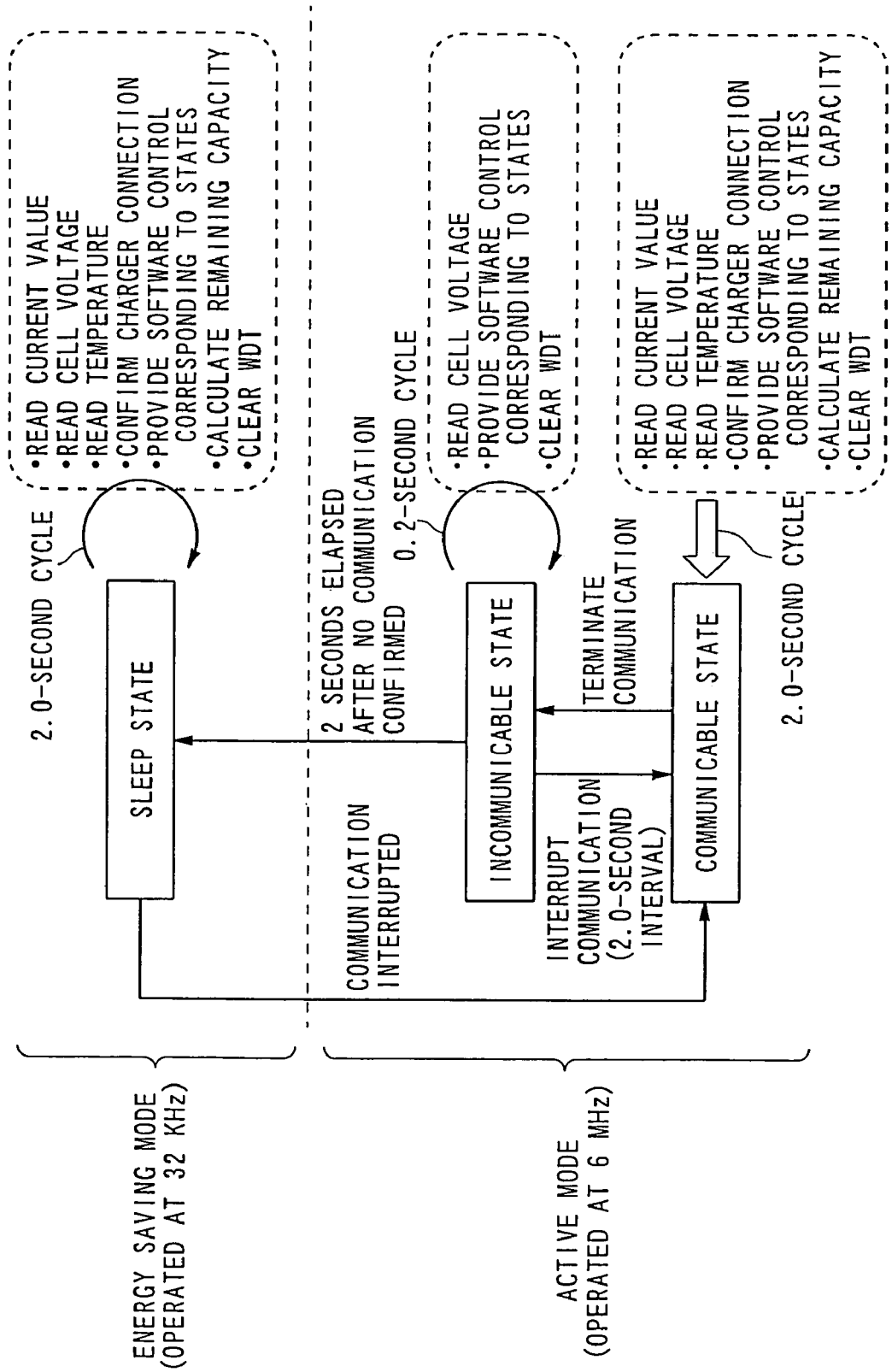
FIG. 15 illustrates changes of microcontroller's operation modes.

FIG. 15 illustrates changes of operation modes of the microcontroller 30.

In FIG. 15, when the device to be powered is connected to the battery pack and is turned on, the microcontroller 30 is placed in "active mode" as its operation mode. When the device is turned off or is not connected, the microcontroller 30 is placed in "energy saving mode" as its operation mode. The active mode enables operations at a fast clock of 6 MHz. The energy saving mode enables operations at a low clock of 32 kHz to further improve the power consumption effect.

The active mode is broadly divided into a "communicable state" and an "incommunicable state". The communicable state performs communication between the device and the microcontroller 30 and takes effect corresponding to an interrupt every two seconds based on clocking of the timer 36. Alternatively, the communicable state takes effect in response to an interrupt from the connected device. When a communication interrupt occurs, the CPU 31 reads information from the AD converter 38 and the fuel gauge 39. The CPU 31 provides control to turn on or off the protection switches SW1 and SW2 corresponding to each of the overcurrent, overcharge, and normal operation states. The CPU 31 calculates information needed to display the remaining battery capacity and transmits the information to the device via the communication I/F 41. When the information has been transmitted and the communication with the device terminates, the state changes to the incommunicable state.

In the incommunicable state, the CPU 31 reads information from the AD converter 38 at an interval of 0.2 seconds clocked by the timer 36. The CPU 31 provides control to turn on or off the protection switches SW1 and SW2 corresponding to the identified state. At this time, the CPU 31 does not perform the process to read information from the fuel gauge 39.

In the active mode, the protection process for the battery cell 1 is performed at the 0.2-second cycle. The remaining battery capacity calculation process is performed corresponding to the communication interrupt at the 2-second cycle. These control operations can always stably perform the protection process against variations of the cell voltage. Further, it becomes possible to provide important processes for the sophisticated battery such as communication with devices and calculation of information needed to display the remaining battery capacity with decreased power consumption and sufficient accuracy.

The active mode permits both the protection process for the battery cell 1 and the remaining battery capacity calculation process to be performed at a given cycle. It is desirable to set this cycle to an even-numbered multiple of the cycle only to perform the protection process. If these cycles have the relationship of an odd-numbered multiple, the control stability of the microcontroller 30 is sacrificed. The relationship of an even-numbered multiple can simplify the control by maintaining the stability.

When a communication interrupt occurs after a lapse of two seconds clocked by the timer 36, the incommunicable state changes to the communicable state. When no communication interrupt occurs after a lapse of two seconds, the state changes to a sleep state. In the sleep mode, the microcontroller 30 reads information from the AD converter 38 and the fuel gauge 39 at the 2-second cycle. The microcontroller 30 provides control to turn on or off the protection switches SW1 and SW2 according to the identified state and calculates information needed for the remaining capacity display. Calculated values are stored in the EEPROM 35, for example, are used for every calculation process, and are updated by a newly calculated value. A communication interrupt, when occurred, enables the active mode and changes the incommunicable state to the communicable state.

As mentioned above, the microcontroller 30 controls the transition between the active mode and the energy saving mode. For this purpose, the microcontroller 30 determines whether or not the device is connected or the connected device is turned on by detecting whether or not the communication with the device takes place at a specified interval. That is to say, when the communication with the device does not take place within a specified time period, the microcontroller 30 assumes a decrease in the discharge load of the battery cell 1 and permits operations in the energy saving mode.

The energy saving mode increases the interval to perform the protection process for the battery cell 1 to prolong the time during which the AD converter 38 stops operating. In this manner, it is possible to greatly save the power consumption.

Even when the microcontroller 30 operates in the energy saving mode, the overcurrent detection circuit 20 always detects an overcurrent. If an overcurrent is detected, the protection switches SW1 and SW2 are controlled according to the state. At this time, the microcontroller 30 is interrupted. When detecting the interrupt, the microcontroller 30 is temporarily restored from the sleep state to set the overcurrent state in the RAM 34, for example.

Even when the battery pack does not supply power to the device, the overcurrent detection circuit 20 needs to be always operated in addition to the protection process for the battery cell 1 by the microcontroller 30. Accordingly, decreasing the power consumption of the microcontroller 30 is very important to provide the stable protection function for the battery cell 1.

The microcontroller 30 is provided with the watch dog timer 37 especially for the purpose of ensuring stable operations of the protection function for the battery cell 1. The watch dog timer 37 always monitors timings to perform the protection process. If the protection process is not performed within the specified time of two seconds or more, the watch dog timer 37 assumes an erratic operation of the microcontroller 30 and resets it. Accordingly, each operation mode resets the count value of the watch dog timer 37 at every termination of the protection process (i.e., state determination based on the cell voltage and control of the protection switches SW1 and SW2 corresponding to the state). In this manner, it is possible to always avoid an erratic operation of the microcontroller 30 itself and normally operate the protection function for the battery cell 1.

[Overall Process of the Microcontroller after Restart]

With reference to a flowchart, the following describes an overall process flow of the microcontroller 30 including the protection of the battery cell 1 and the remaining battery capacity calculation.

Figure 16:
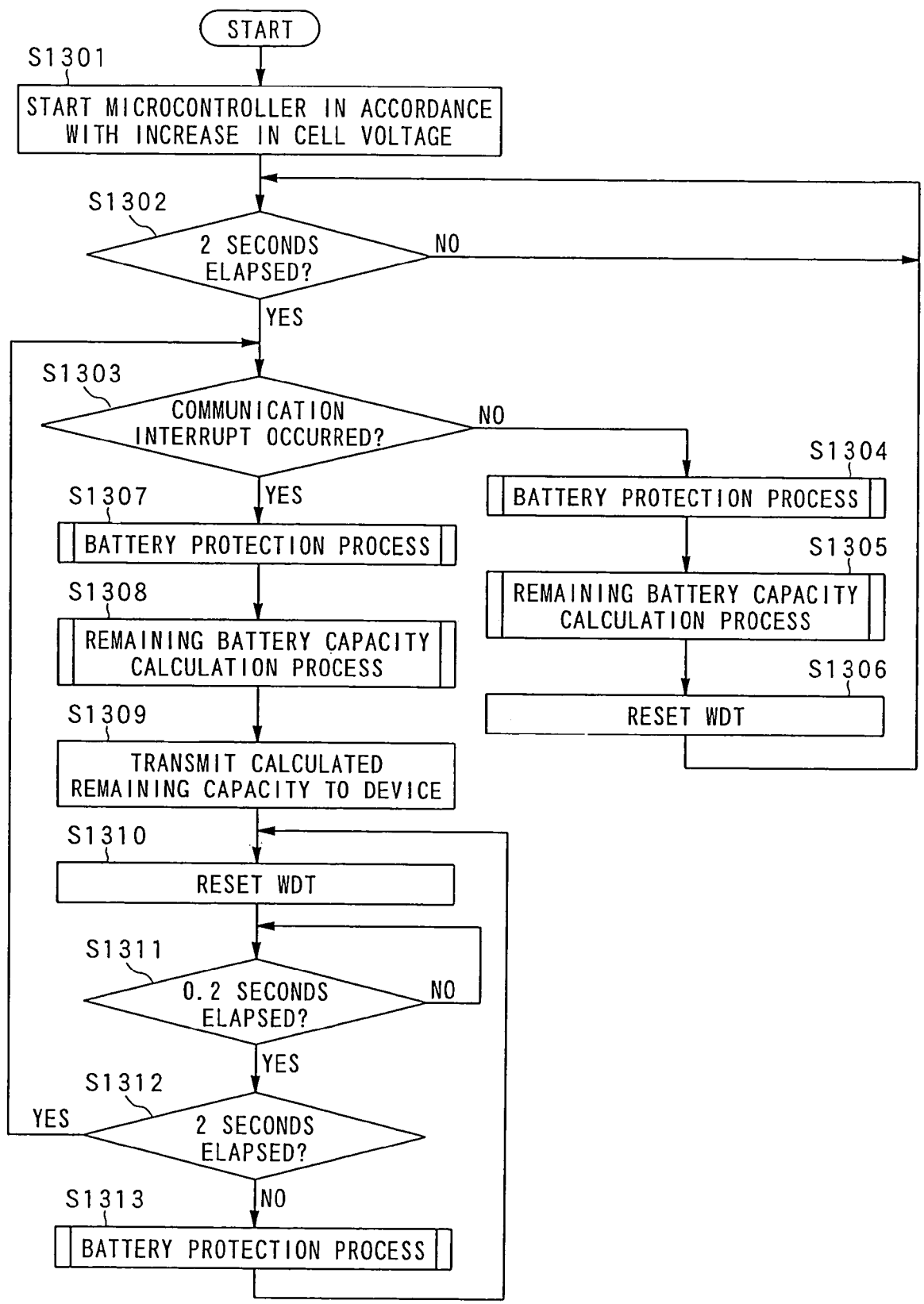
FIG. 16 is a flowchart showing an overall flow of microcontroller processes.

FIG. 16 is a flowchart showing an overall flow of processes by the microcontroller 30.

At step S1301, the cell voltage increases to increase the power supply voltage supplied to the microcontroller 30. When the power supply voltage reaches a specified value, the microcontroller 30 starts based on a timing signal from the power supply circuit 10. The process immediately after the startup corresponds to the process in FIG. 9 and a description is omitted.

At step S1302, the timer 36 starts counting the time. After the elapse of two seconds, the process proceeds to step S1303.

At step S1303, the CPU 31 determines whether or not a communication interrupt occurs during the 2-second count. If no interrupt occurs, the process proceeds to step S1304. If an interrupt occurs, the process proceeds to step S1307.

The process operates in the energy saving mode from steps S1304 through S1306. At step S1304, the process performs a subroutine, i.e., the protection process for the battery cell 1 (hereafter referred to as a battery protection process). Based on the cell voltage detection, the subroutine determines whether or not an abnormal state occurs in the battery cell 1. The subroutine controls the charge and the discharge according to the state. This subroutine will be described later with reference to FIG. 17.

At step S1305, the process performs a subroutine for remaining battery capacity detection. The subroutine calculates information needed to display the remaining battery capacity in a device to be connected. This subroutine will be described later with reference to FIG. 18.

At step S1306, the process resets the count value of the watch dog timer 37. The process returns to step S1302 to determine whether or not another communication interrupt occurred during two seconds.

If a communication interrupt occurred during two seconds, the process is performed in the active mode. At step S1307, the battery protection process is performed like step S1304.

At step S1308, the remaining battery capacity calculation process is performed like step S1305.

At step S1309, the process transmits information needed for the remaining capacity display such as the value calculated at step S1308 to the device via the communication I/F 41. This information includes, for example, the present voltage and temperature of the battery cell 1, the accumulated remaining discharge current and power consumption calculated from the accumulated current value, and the temperature coefficient specific to the battery cell 1.

At step S1310, the process resets the count value of the watch dog timer 37.

At step S1311, the process determines based on the count of the timer 36 whether or not an interval of 0.2 seconds has elapsed after occurrence of the communication interrupt (corresponding to step S1303). If that period has elapsed, the process proceeds to step S1312.

At step S1312, the process determines whether or not an interval of 2 seconds has elapsed after occurrence of the communication interrupt. If not, the process proceeds to step S1313. If an interval of 2 seconds has elapsed, the process returns to step S1303 to determine whether or not a communication interrupt occurs.

At step S1313, the battery protection process is performed like steps S1304 and S1307. The battery protection process is performed at an interval of 0.2 seconds. On the other hand, the remaining battery capacity calculation process at step S1308 is performed at an interval of 2 seconds.

Though not shown, the overcurrent detection circuit 20 always detects an overcurrent in the battery cell 1 independently of operations of the microcontroller 30. When detecting an overcurrent, the overcurrent detection circuit 20 turns the protection switches SW1 and SW2 off and on, respectively. In addition, the overcurrent detection circuit 20 interrupts the microcontroller 30 due to overcurrent occurrence.

In the microcontroller 30, the CPU 31 monitors an interrupt from the overcurrent detection circuit 20 as needed during the process according to the flowchart. When detecting an interrupt caused by the overcurrent, the CPU 31 rewrites state-indicating mode information (Safe mode) stored in the RAM 34 so as to indicate the overcurrent state.

Figure 17:
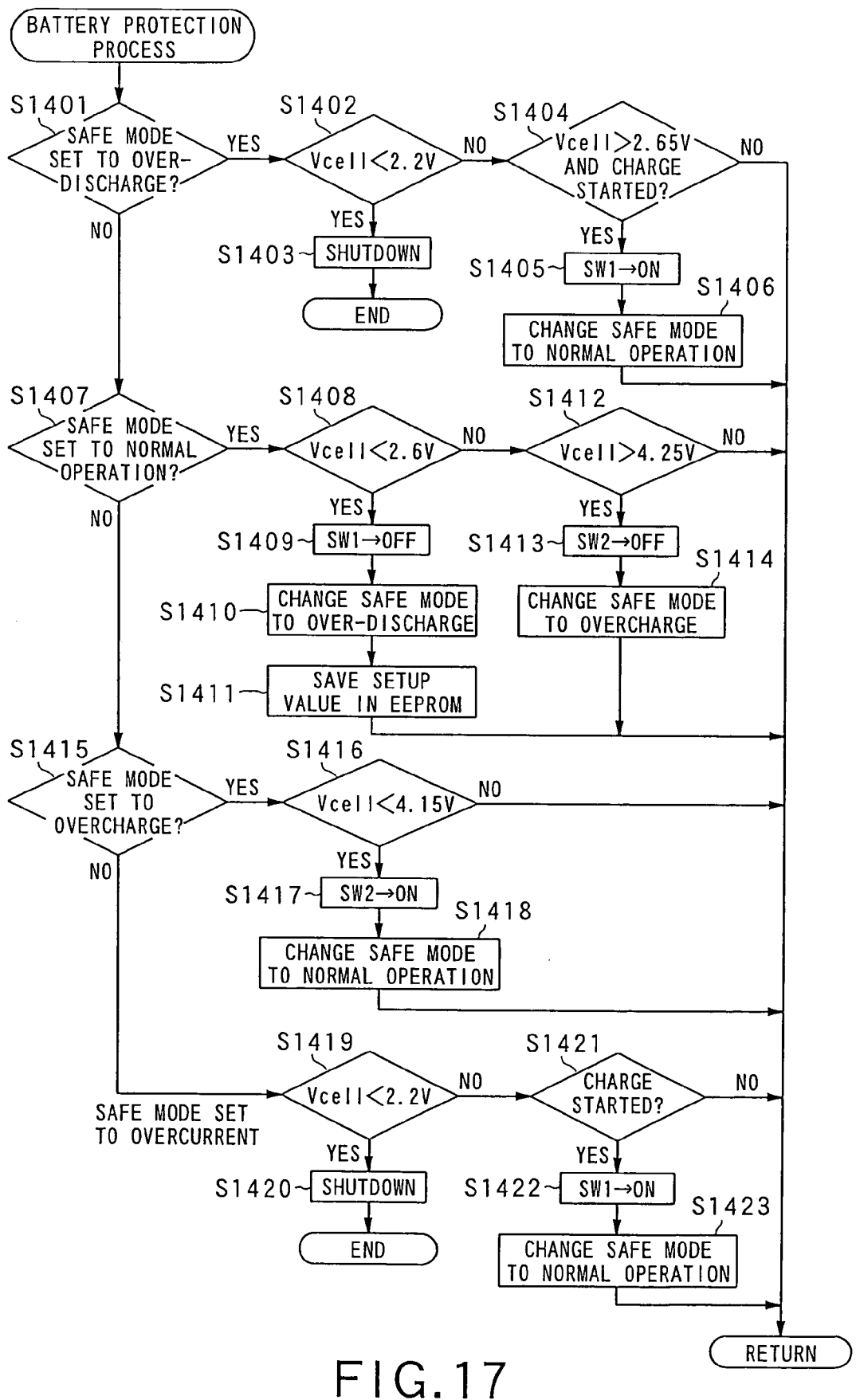
FIG. 17 is a flowchart showing a battery protection process by the microcontroller.

FIG. 17 is a flowchart showing the battery protection process (corresponding to steps S1304, S1307, and S1313 in FIG. 16) by the microcontroller 30.

The CPU 31 first reads the Safe mode stored in the RAM 34 to identify the present protection state (corresponding to steps S1401, S1407, S1415, and S1419).

If the over-discharge state takes effect presently at step S1401, the process proceeds to step S1402.

At step S1402, the process reads the cell voltage (Vcell) from the AD converter 38. If the cell voltage is lower than 2.2 V, the process proceeds to step S1403 or otherwise to step S1404.

At step S1403, the process assumes the cell voltage to be very low and shuts down the microcontroller 30 itself.

At step S1404, the process reads not only the cell voltage from the AD converter 38, but also the information indicating whether or not the charger is connected and whether or not a charge voltage is applied. If the cell voltage is higher than 2.65 V and the charge starts, the process proceeds to step S1405 or otherwise terminates the subroutine.

At step S1405, the process transmits a control signal to the FET driver 42 to turn on the protection switch SW1. At this time, the protection switch SW2 is turned on.

At step S1406, the process rewrites the Safe mode in the RAM 34 so as to indicate the normal operation and terminates the subroutine.

At step S1407, if the normal operation state takes effect presently based on the read Safe mode, the process proceeds to step S1408.

At step S1408, if the cell voltage read from the AD converter 38 is lower than 2.6 V, the process proceeds to step S1409 or otherwise to step S1412.

At step S1409, the process transmits a control signal to the FET driver 42 to turn off the protection switch SW1. At this time, the protection switch SW2 is turned on.

At step S1410, the process rewrites the Safe mode in the RAM 34 so as to indicate the over-discharge state.

The cell voltage may further decrease thereafter to shut down the microcontroller 30. To prepare for this situation at step S1411, the process copies the configuration value stored in the RAM 34 and the like to the EEPROM 35 for saving. This configuration value is associated with the present operation state. Then, the subroutine terminates.

At step S1412, if the cell voltage is higher than 4.25 V, the process proceeds to step S1413 or otherwise terminates the subroutine.

At step S1413, the protection switch SW2 turns off.

At step S1414, the process rewrites the Safe mode in the RAM 34 so as to indicate the overcharge state, and then terminates the subroutine.

At step S1415, if the overcharge state takes effect presently based on the read Safe mode, the process proceeds to step S1416.

At step S1416, if the cell voltage read from the AD converter 38 is lower than 4.15 V, the process proceeds to step S1417 or otherwise terminates the subroutine.

At step S1417, the process turns on the protection switch SW2.

At step S1418, the process rewrites the Safe mode in the RAM 34 so as to indicate the normal operation state and terminates the subroutine.

If it is determined at step S1415 that the overcharge state does not take effect presently, the process determines that the overcurrent state take effect presently, and then proceeds to step S1419.

At step S1419, if the cell voltage read from the AD converter 38 is lower than 2.2 V, the process proceeds to step S1420 or otherwise to step S1421.

At step S1420, the process shuts down the microcontroller 30 itself.

At step S1421, the process reads the information from the AD converter 38 indicating whether or not the charger is connected and whether or not a charge voltage is applied. If the charge starts, the process proceeds to step S1422 or otherwise terminates the subroutine.

At step S1422, the process turns on the protection switch SW1.

At step S1423, the process rewrites the Safe mode in the RAM 34 so as to indicate the normal operation and terminates the subroutine.

The above-mentioned processes implement the charge and discharge control corresponding to the present cell voltage and restoration from the overcurrent state under software control of the microcontroller 30. When the Safe mode is rewritten, it may be preferable to log the state transition in the EEPROM 35.

Figure 18:
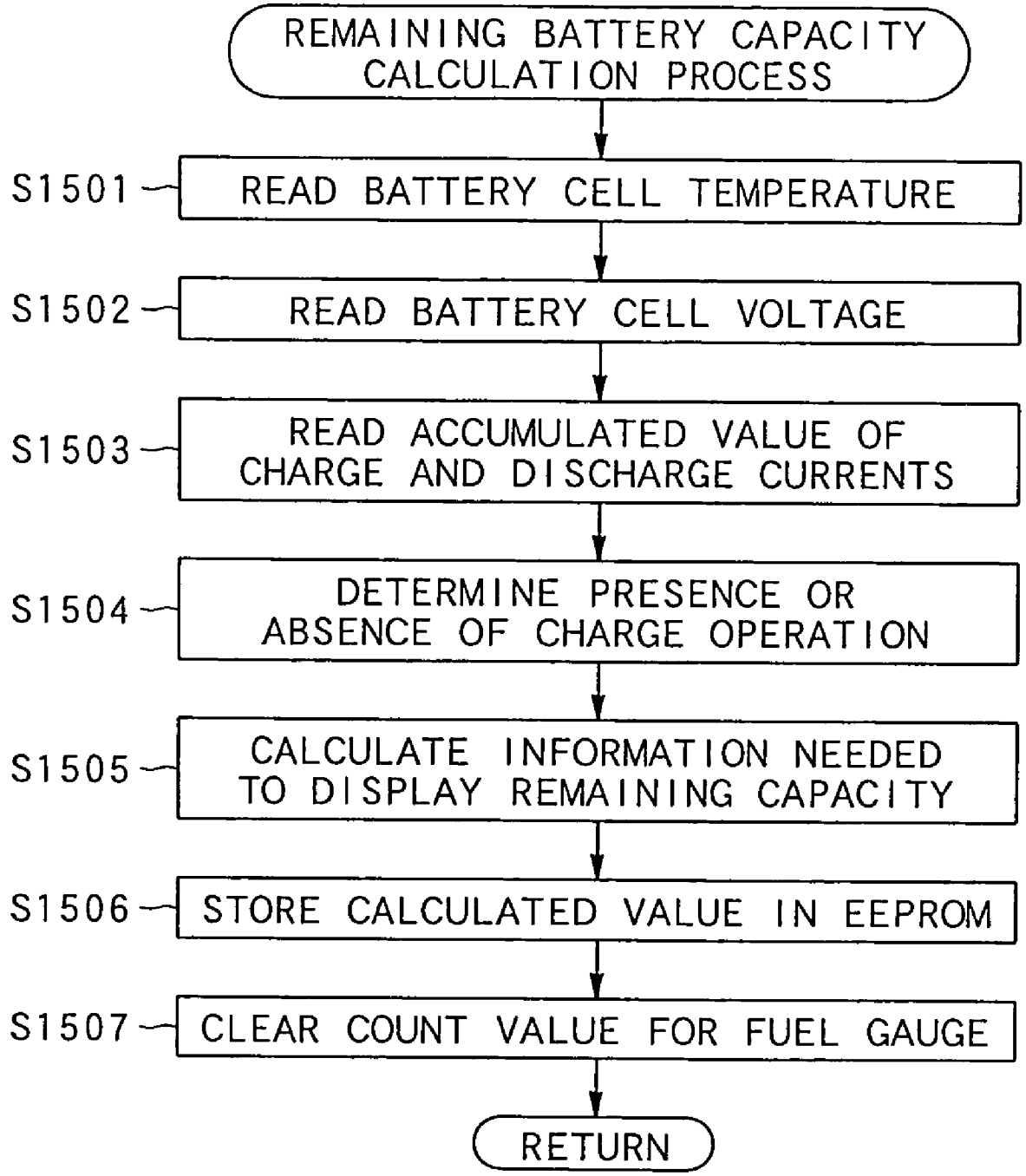
FIG. 18 is a flowchart showing a remaining battery capacity calculation process by the microcontroller.

FIG. 18 is a flowchart showing a remaining battery capacity calculation process (corresponding to steps S1305 and S1308 in FIG. 16) by the microcontroller 30.

At step S1501, the process reads the temperature of the battery cell 1 according to an output signal from the AD converter 38.

At step S1502, the process reads the voltage of the battery cell 1 according to an output signal from the AD converter 38.

At step S1503, the process reads an accumulated value of the charge and discharge currents from the fuel gauge 39.

At step S1504, the process determines the presence or absence of a charger's charge operation according to an output signal from the AD converter 38.

At step S1505, the process calculates information needed to display the remaining battery capacity in the device based on the information acquired at steps S1501 through S1504. At this step, for example, the process calculates the accumulated remaining discharge current amount and the power consumption based on an accumulated current value acquired from the fuel gauge 39.

At step S1506, the process stores the calculated value in the EEPROM 35. For example, the process also stores the detected voltage and temperature of the battery cell 1.

At step S1507, the process clears the count values in the charge counter 39*d* and the discharge counter 39*e*, and then terminates the subroutine.

The above-mentioned process in FIG. 18 is performed at a specified time period to highly accurately monitor the remaining battery capacity.

[Circuit Configuration of Serially Connected Battery Cells]

There has been described the use of a single battery cell. Actually, there may be used a plurality of serially connected battery cells depending on the degree of loads on a connected device. In such case, it is necessary to determine the overcharge or over-discharge state for each of the battery cells. In consideration of this, the following provides supplementary explanation about the circuit configuration and operations.

Figure 19:
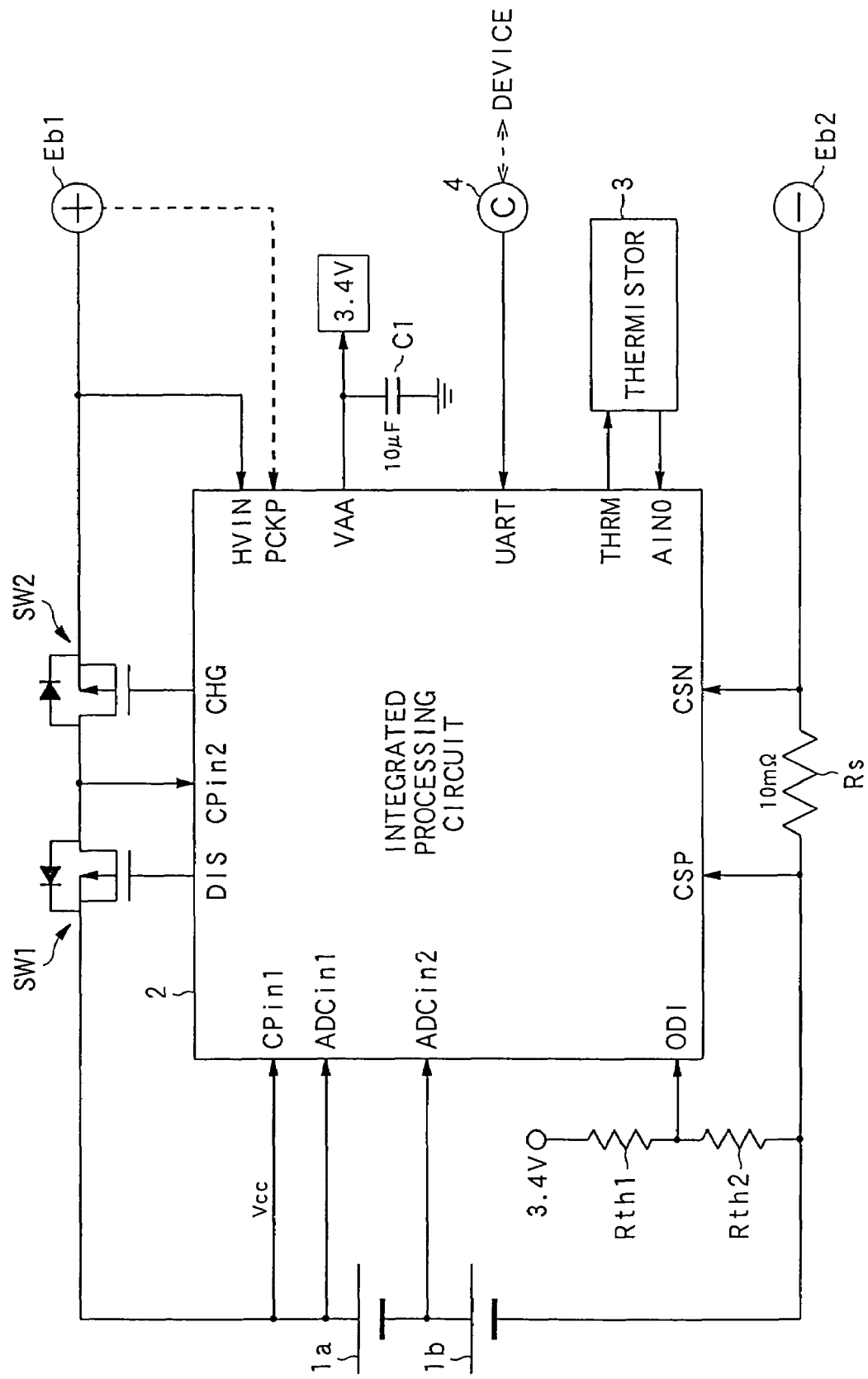
FIG. 19 shows an internal configuration example of a battery pack using a plurality of serially connected battery cells.

FIG. 19 shows an internal configuration example of a battery pack using a plurality of serially connected battery cells. The mutually corresponding components in FIGS. 19 and 4 are designated by the same reference numerals and symbols and a detailed description is omitted for simplicity.

A cell voltage needs to be individually detected for each of the serially connected battery cells. To do this, it is necessary to provide the AD converter with input channels corresponding to the number of battery cells. FIG. 19 shows an example of serially connecting two battery packs 1*a* and 1*b*. Two input terminal ADCin1 and ADCin2 are individually provided to detect voltages at each positive electrode of the battery packs 1*a* and 1*b*. The AD converter in the microcontroller has differential inputs configured to detect a difference between the input terminals ADCin1 and ADCin2 and a difference between the input terminal ADCin2 and an installation potential. In this manner, the microcontroller's CPU can individually acquire cell voltages of the battery cells 1*a* and 1*b*.

With reference to FIG. 16, the battery protection process at steps S1304 and S1307 just need to be performed for each of the serially connected battery cells. In consideration of the safety, however, a charge current needs to be cut off when even a single battery cell indicates the over-discharge state during the normal operation state. If the cell voltage of at least one of battery cells becomes lower than 2.6 V at step S1408 in FIG. 17, for example, the process needs to proceed to step S1409 to change the state to the over-discharge state. At step S1404, the state must not be restored to the normal operation state until cell voltages of all the battery cells become higher than 2.65 V.

Likewise, a discharge current needs to be cut off when even a single battery cell indicates the overcharge state. If the cell voltage of at least one of battery cells becomes higher than 4.25 V at step S1412 in FIG. 17, for example, the process needs to proceed to step S1413 to change the state to the overcharge state. At step S1416, the state must not be restored to the normal operation state until cell voltages of all the battery cells become lower than 4.15 V.

As mentioned above, the overcharge or over-discharge state is determined under software control of the microcontroller. The embodiment can be applied to a plurality of serially connected battery cells by easily modifying the software on the basis of looping part of the program modules. This makes it possible to suppress design costs and the circuit scale without the need to provide additional circuits in accordance with the number of battery cells used as conventionally practiced.

On the other hand, it may be preferable to install the software compliant with serially connected battery cells from the beginning. Then, the same software can be used to perform the protection process for all battery packs that can use up to the specified number of battery cells. For example, the software compliant with two serially connected battery cells as shown in FIG. 19 can be applied to a single battery cell by assuming voltages at the input terminal ADCin1 and ADCin2 to be the same. The protection process can be performed with no change in the software.

What is claimed is:

1. A battery pack composed of a secondary battery integrally with a processing circuit to perform processes including protection against error occurrence in the secondary battery, the battery pack comprising:

discharge current cutoff means for selectively cutting off a discharge current in the secondary battery;

charge current cutoff means for selectively cutting off a charge current in the secondary battery;

protection process means for controlling operations of the discharge current cutoff means and the charge current cutoff means at least in accordance with an inter-electrode voltage between positive and negative electrodes of the secondary battery, wherein when it is determined that the secondary battery is placed in the overcharge state, the charge current cutoff means cuts off the charge current, and when it is determined that the secondary battery is placed in the over-discharge state, the discharge current cutoff means cuts off the discharge current, thereby protecting the secondary battery against abnormal states such as an overcharge and an over-discharge;

startup-enabling voltage detection means for generating a detection signal when a power supply voltage supplied to the protection process means reaches a lowest voltage to start the protection process means, wherein the protection process means performs an initialization process in accordance with detection of a detection signal from the startup-enabling voltage detection means; and nonvolatile storage means for rewritably storing configuration values for the initialization process of the protection process means as needed, wherein the configuration values are stored in an active software memory which is read immediately after the protection process means starts.

2. The battery pack according to claim 1, further comprising:
- stable drive voltage detection means for generating a detection signal when the power supply voltage reaches a specified voltage which is higher than the lowest voltage and is smaller than or equal to a voltage to stably drive the protection process means,
- wherein the protection process means, after performing the initialization process, configures a threshold voltage needed for operation control of the discharge current cutoff means and the charge current cutoff means in accordance with detection of a detection signal from the stable drive voltage detection means.

3. The battery pack according to claim 2, further comprising:
- erratic operation avoidance means for monitoring an operation of the protection process means and,
- when detecting an erratic state, allows the protection process means to perform the initialization process,
- wherein the protection process means initializes a configuration value for the erratic operation avoidance means in accordance with detection of a detection signal from the stable drive voltage detection means.

4. The battery pack according to claim 1, further comprising:
- stable drive voltage detection means for generating a detection signal when the power supply voltage reaches a specified voltage which is higher than the lowest voltage and is smaller than or equal to a voltage to stably drive the protection process means,
- wherein the protection process means, after performing the initialization process, receives a detection signal from the stable drive voltage detection means and,
- after a lapse of time sufficiently longer than an instruction clock cycle of the protection process means, starts performing a normal process to control operations of the discharge current cutoff means and the charge current cutoff means.

5. The battery pack according to claim 1, further comprising:
- read-only storage means for previously storing an initialization value for an operation of the protection process means;
- wherein the protection process means, after performing the initialization process, uses the initialization value stored in the read-only storage means to control operations of the discharge current cutoff means and the charge current cutoff means and,
- when the inter-electrode voltage of the secondary battery rises to a specified value, reads the configuration value stored in the nonvolatile storage means.

6. The battery pack according to claim 1,
- wherein, while the initialization process is being performed, a power supply voltage supplied to the protection process means is generated based on a voltage between charge terminals for connecting a charger to charge the secondary battery.

7. The battery pack according to claim 1, further comprising:
- boost means for boosting the inter-electrode voltage of at least the secondary battery,
- wherein the power supply voltage is supplied to the protection process means via the boost means.

8. A battery protection process apparatus to perform a process to protect a secondary battery against anomaly occurrence, the apparatus comprising:
- discharge current cutoff means for selectively cutting off a discharge current in the secondary battery;
- charge current cutoff means for selectively cutting off a charge current in the secondary battery;
- protection process means for controlling operations of the discharge current cutoff means and the charge current cutoff means at least in accordance with an inter-electrode voltage between positive and negative electrodes of the secondary battery, wherein when it is determined that the secondary battery is placed in the overcharge state, the charge current cutoff means cuts off the charge current, and when it is determined that the secondary battery is placed in the over-discharge state, the discharge current cutoff means cuts off the discharge current, thereby protecting the secondary battery against abnormal states such as an overcharge and an over-discharge;
- startup-enabling voltage detection means for generating a detection signal when a power supply voltage supplied to the protection process means reaches a lowest voltage to start the protection process means,
  - wherein the protection process means performs an initialization process in accordance with detection of a detection signal from the startup-enabling voltage detection means; and
- nonvolatile storage means for rewritably storing configuration values for the initialization process of the protection process means as needed,
  - wherein the configuration values are stored in an active software memory which is read immediately after the protection process means starts.

9. A startup control method for a battery protection process apparatus, the method comprising the steps of:
- cutting off the charge current when it is determined that a secondary battery is placed in the overcharge state, and cutting off the discharge current when it is determined that the secondary battery is placed in the over-discharge state, thereby protecting the secondary battery against abnormal states such as an overcharge and an over-discharge;
- performing an initialization process of the battery protection process apparatus when a power supply voltage supplied to the battery protection process apparatus reaches a lowest voltage to start the battery protection process apparatus,
- wherein configuration values needed for the initialization process are stored in an active software memory which is read immediately after the protection process apparatus starts.

10. The startup control method for a battery protection process apparatus according to claim 9, the method comprising:
- configuring a threshold voltage needed for operation control of the discharge current cutoff circuit and the charge current cutoff circuit and starting the protection process when the power supply voltage reaches a specified voltage which is smaller than or equal to a voltage to stably drive the battery protection process apparatus.

* * * * *